(12) United States Patent
Hamada

(10) Patent No.: US 9,615,018 B2
(45) Date of Patent: Apr. 4, 2017

(54) ELECTRONIC APPARATUS AND METHOD OF CONTROLLING THE SAME

(71) Applicant: SAMSUNG ELECTRONICS CO., LTD., Suwon-si, Gyeonggi-do (KR)

(72) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 14/535,458

(22) Filed: Nov. 7, 2014

(65) Prior Publication Data

US 2015/0124153 A1 May 7, 2015

(30) Foreign Application Priority Data

Nov. 7, 2013 (KR) .................. 10-2013-0134992

(51) Int. Cl.
*H04N 5/232* (2006.01)

(52) U.S. Cl.
CPC .............................. *H04N 5/23212* (2013.01)

(58) Field of Classification Search
None
See application file for complete search history.

(56) References Cited

U.S. PATENT DOCUMENTS

| | | |
|---|---|---|
| 4,860,045 A | 8/1989 | Hamada et al. |
| 4,967,224 A | 10/1990 | Hamada et al. |
| 8,218,962 B2 | 7/2012 | Fujii et al. |
| 2011/0013061 A1 | 1/2011 | Hoda et al. |
| 2012/0237193 A1 | 9/2012 | Kawarada |
| 2012/0301125 A1 | 11/2012 | Ashida |

FOREIGN PATENT DOCUMENTS

| | | | |
|---|---|---|---|
| JP | 08-27425 B2 | 3/1996 | |
| JP | 2009-128610 A | 6/2009 | |
| JP | 2010-107711 A | 5/2010 | |
| JP | 2010-160271 A | 7/2010 | |
| JP | 2010-169882 A | 8/2010 | |
| JP | 4978449 B2 | 7/2012 | |
| WO | WO 2013/088917 | * | 6/2013 |

OTHER PUBLICATIONS

Extended European Search Report issued for EP 14192355.7 (Mar. 18, 2015).

* cited by examiner

*Primary Examiner* — Twyler Haskins
*Assistant Examiner* — Angel L Garces-Rivera
(74) *Attorney, Agent, or Firm* — Drinker Biddle & Reath LLP

(57) ABSTRACT

A digital image processing apparatus and a method of controlling the same are provided. The method of controlling an image plane phase difference digital image processing apparatus, the method includes, in a continuous photographing mode for continuously capturing still images, performing a first focus detection by detecting phase difference of an image captured during a first image capture; performing a second focus detection by detecting phase difference of an image captured during a second image capture; determining moving speed of an object based on results of the first focus detection and the second focus detection; and correcting focus location by driving a focusing lens based on the determined moving speed of the object.

18 Claims, 16 Drawing Sheets

ELECTRONIC APPARATUS AND METHOD OF CONTROLLING THE SAME

CROSS-REFERENCE TO RELATED APPLICATIONS

This application claims the priority benefit of Korean Patent Application No. 10-2013-0134992, filed on Nov. 7, 2013, in the Korean Intellectual Property Office, the disclosure of which is incorporated herein in its entirety by reference.

BACKGROUND

1. Field

One or more embodiments of the invention relate to an electronic apparatus (e.g., a digital photographing apparatus) and a method of controlling the same, and more particularly, to an electronic apparatus employing an image plane phase difference auto focus (AF) for predicting motion of an object and a method of controlling the same.

2. Description of the Related Art

In a single lens reflex (SLR) camera in the related art, phase difference auto focus (AF) is performed for focusing on an object. To perform the phase difference AF, it is necessary to arrange an AF mirror between an imaging lens and an imaging device. Performing phase difference AF using a mirror requires evacuating operation and installing operation of the mirror for performing AF while images are being continuously captured, and thus it is difficult to continuously captured images at high speed.

Meanwhile, in a mirror-less camera employing image plane phase difference AF, phase difference detecting pixels that may be used for phase difference AF are arranged at an imaging device, and thus an AF mirror is not necessary. Therefore, a mirror-less camera is capable of continuously capturing images at higher speed as compared to a SLR camera.

However, to continuously capture images of a moving object using a mirror-less camera, an imaging sensor outputs a signal of phase difference detecting pixels for AF detection during live-view image display. Therefore, a focus is detected based on that information. Therefore, in the case of an object motion (referred to hereinafter as "moving object") predicting AF, AF is possible only while a live-view image is being displayed. As a result, it is difficult to capture continuous photographing images (referred to hereinafter as "continuous image capture") and performing moving object predicting AF at high speed.

Meanwhile, methods for performing AF with prediction of motion of an object in contrast AF technique have been introduced. However, focus may only be detected while live-view image is being displayed in the methods, and thus it is difficult to perform AF at high speed.

SUMMARY

One or more embodiments include an electronic apparatus (e.g., a digital photographing apparatus) employing an image plane phase difference AF capable of focusing on a moving object even during a high-speed continuous image capture operation by performing moving object prediction AF based on focal points detected during previous image capture operations.

Additional aspects will be set forth in part in the description which follows and, in part, will become apparent from the description, or may be learned by practice of the presented embodiments.

According to one or more embodiments, a digital image processing apparatus includes: an imaging lens including a focusing lens; a lens driving unit that drives the focusing lens; an imaging device including imaging pixels for capturing a light transmitted through the focusing lens and generating image signals, and phase difference detecting pixels for detecting phase difference of a captured image; and a control unit, which controls the phase difference detecting pixels to perform focus detection by detecting phase difference of a live-view image while the live-view image is output from the imaging pixels. Where, in a continuous photographing mode for continuously capturing still images, the control unit includes a first calculation unit, which performs a first focus detection by detecting phase difference of a still image captured during a first image capture operation; a second calculation unit, which performs a second focus detection by detecting phase difference of a still image captured during a second image capture operation; a moving speed determining unit, which determines moving speed of an object based on results of the first focus detection and the second focus detection; and a focus location correcting unit, which corrects focus location by driving the focusing lens based on the determined moving speed of the object.

The control unit controls the imaging device to not to display a live-view image during image capture operations in the continuous photographing mode.

The control unit controls outputting of a still image captured by the imaging device as an after-view image in the continuous photographing mode.

The focus location correcting unit corrects focus location by driving the focusing lens within a preset time period.

The control unit further includes a third calculation unit, which performs a third focus detection by detecting phase difference of a still image captured during a third image capture operation, and the moving speed determining unit determines moving speed of the object based on results of the first focus detection, the second focus detection, and the third focus detection.

The continuous photographing mode includes a first continuous photographing mode, in which the imaging device outputs a live-view image; and a second continuous photographing mode, in which the imaging device does not output a live-view image.

When the digital image processing apparatus is in the first continuous photographing mode and the imaging device outputs a live-view image, the control unit controls focus detection by detecting phase difference of the live-view image. And, when the digital image processing apparatus is in the second continuous photographing mode and the imaging device captures a still image, the control unit controls focus detection by detecting phase difference of the captured still image.

When the digital image processing apparatus is in the second continuous photographing mode, the control unit controls the imaging device to not to display a live-view image and to display a still image captured by the imaging device as an after-view image.

The imaging device further includes a global shutter, which is operable to control exposure time.

In the continuous photographing mode, the imaging device displays live-view images between image capture operations using the global shutter.

According to one or more embodiments, a method of controlling an image plane phase difference digital image processing apparatus in a continuous photographing mode for continuously capturing still images, the method includes:

performing a first focus detection by detecting phase difference of an image captured during a first image capture operation; performing a second focus detection by detecting phase difference of an image captured during a second image capture operation; determining moving speed of the object based on results of the first focus detection and the second focus detection; and correcting focus location by driving the focusing lens based on the determined moving speed of the object.

The method further includes controlling an imaging device to not to display a live-view image during image capture operations in the continuous photographing mode.

The method further includes outputting a still image captured by the imaging device as an after-view image in the continuous photographing mode.

Focus location is corrected by driving the focusing lens within a preset time period.

The continuous photographing mode includes a first continuous photographing mode, in which live-view images are output between continuous image capture operations; and a second continuous photographing mode, in which live-view images are not output between continuous image capture operations.

The method further includes, when the digital image processing apparatus is in the first continuous photographing mode and the imaging device outputs a live-view image, performing focus detection by detecting phase difference of the live-view image, and, when the digital image processing apparatus is in the second continuous photographing mode and the imaging device captures a still image, performing focus detection by detecting phase difference of the captured still image.

The number of still images captured during a unit time period in the second continuous photographing mode is greater than the number of still images captured during the unit time period in the first continuous photographing mode.

The method further includes controlling time period for exposing the imaging device using a global shutter; and displaying live-view images between continuous image capture operations in the continuous photographing mode.

The method further includes, when a live-view image is being displayed, focus detection is performed by detecting phase difference of the live-view image; when the still image is captured, focus detection is performed by detecting phase difference of the captured still image; determining moving speed of an object based on a result of the focus detection of the live-view image and a result of the focus detection of the captured still image; and correcting a focus location based on the determined moving speed of the object during a next image capture operation.

According to one or more embodiments, a computer readable recording medium having recorded thereon a computer program executable by a processor for implementing a method of controlling a digital image processing apparatus is provided.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
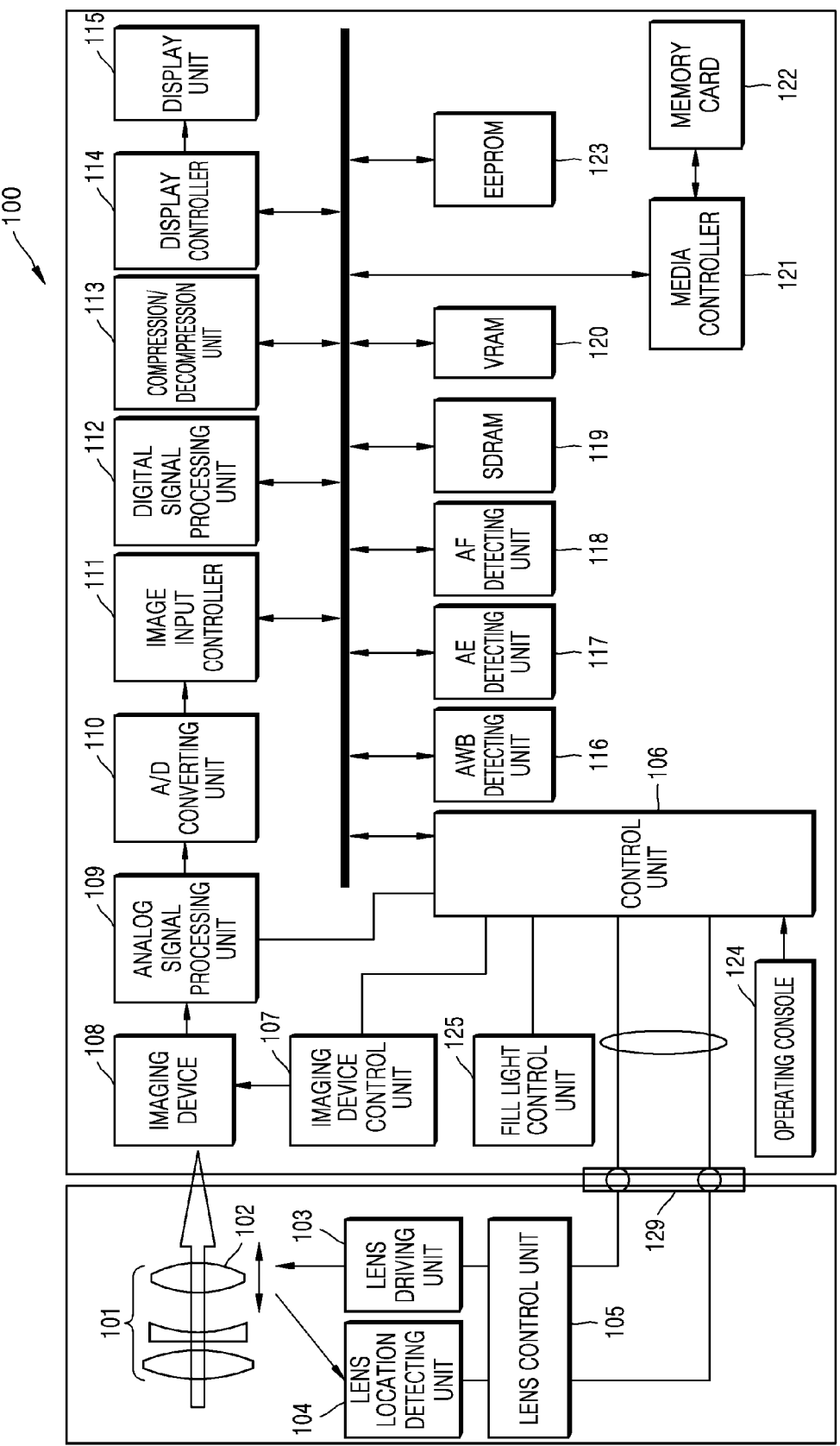
FIG. 1A is a block diagram illustrating a digital image processing apparatus for moving object prediction AF via phase difference AF, according to an embodiment.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and scope of the invention are encompassed in the invention. In the description, certain detailed explanations of the related art are omitted when it is deemed that they may unnecessarily obscure the essence of the invention.

While such terms as "first", "second", etc., may be used to describe various components, such components are not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Reference will now be made in detail to embodiments, examples of which are illustrated in the accompanying drawings, wherein like reference numerals refer to like elements throughout.

[Configuration of a Digital Image Processing Apparatus 100]

FIG. 1A is a block diagram illustrating an electronic apparatus (e.g., digital image processing apparatus 100) for moving object prediction AF via phase difference AF, according to an embodiment.

Referring to FIG. 1A, the digital image processing apparatus 100 and a lens are shown to be detachable. An imaging device 108 is not detachable and may be integrated with the digital image processing apparatus 100, according to another embodiment. Furthermore, by using the imaging device 108 according to an embodiment, the digital image processing apparatus 100 may be capable of performing both phase difference AF and contrast AF.

The digital image processing apparatus 100 includes imaging lenses 101, which includes a focusing lens 102. The digital image processing apparatus 100 has a focus detection function and may drive the focusing lens 102. The lens unit includes a lens driving unit 103 for driving the focusing lens 102, a lens location detecting unit 104 for detecting location of the focusing lens 102, and a lens control unit 105 for controlling the focusing lens 102. The lens control unit 105 exchanges information regarding focus detection with a control unit 106 of the digital image processing apparatus 100.

The digital image processing apparatus 100 includes the imaging device 108 and generates image signals by imaging an object light transmitted through the imaging lenses 101. The imaging device 108 may includes a plurality of photoelectric converting units (not shown) that are arranged in a matrix shape and a transmission line (not shown) for moving charges from the photoelectric converting units and reading out image signals. In various embodiments, phase difference detecting pixels may be arranged at particular locations of the imaging device 108 to a designated percentage and perform image plane AF function.

An imaging device control unit 107 generates timing signals and controls the imaging device 108 to capture an image. Furthermore, when charge accumulation is completed at each scan line, the imaging device control unit 107 in turn controls the read-out image signals.

Read-out signals are transmitted through an analog signal processing unit 109, converted into digital signals by an A/D converting unit 110, and input to an image input controller 111 and processed thereby.

Auto white balance (AWB), auto exposure (AE), and AF calculations are performed with respect to digital image signals input to the image input controller 111 at an AWB detecting unit 116, an AE detecting unit 117, and an AF detecting unit 118, respectively. Here, the AF detecting unit 118 outputs detected wave values with respect to contrast values during contrast AF, and outputs pixel information to the control unit 106 during a phase difference AF for phase difference calculation. The control unit 106 may perform phase difference calculation by calculating correlations between a plurality of pixel column signals. As a result of the calculation, location or direction of a focus may be calculated.

Outputs of phase difference detecting pixels are output together when live-view or image-view (referred to hereinafter as "live-view") images are output. In other words, only image signals of a designated number of imaging pixels sampled by an imaging device are output when a live-view image is displayed, where outputs of phase difference detecting pixels are included therein.

Furthermore, when capturing a still image, signals of all pixels are output, where outputs of phase difference detecting pixels are included therein.

An image signal is also stored in a SDRAM 119, which is a temporary memory. A digital signal processing unit 112 generates a displayable live-view image or a captured image by performing a series of image signal processes, such as gamma correction. A compression/decompression unit 113 compresses an image signal in a compression format, such as the JPEG format or the H.264 format, or decompresses for image reproduction. An image file, including an image signal compressed in the compression/decompression unit 113, is transmitted to a memory card 122 via a media controller 121 and is stored in the memory card 122. Data regarding an image to be displayed is stored in a VRAM 120, and the image is displayed on a display unit 115 (e.g., a LCD display) via a display controller 114 (e.g., a video encoder). The control unit 106 controls the overall operations of components. An EEPROM 123 stores and retains information for pixel correction of the imaging device 108 or other adjustment information. An operating console 124 receives various inputs from a user for operating the digital image processing apparatus 100. The operating console 124 may include various buttons, such as a shutter-release button, a main button, a mode dial, and a menu button.

Figure 1B:
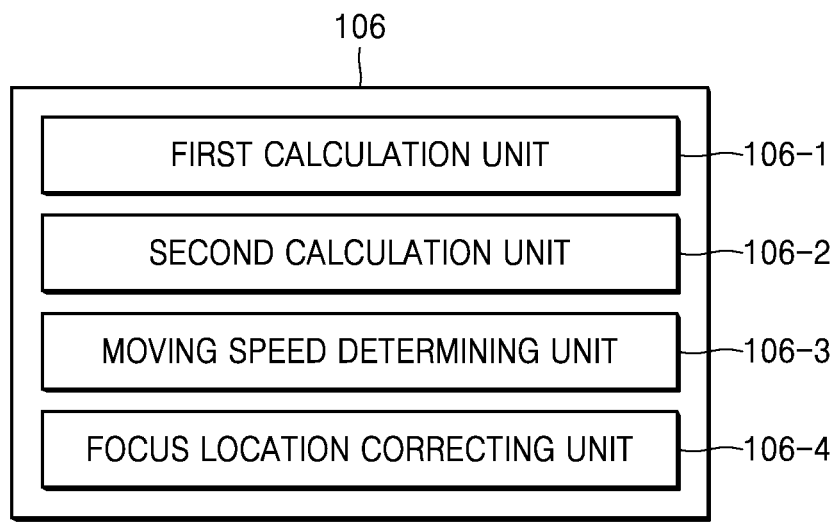
FIG. 1B is a block diagram illustrating a control unit, according to an embodiment.

FIG. 1B is a block diagram illustrating the control unit 106, according to an embodiment.

Referring to FIG. 1B, the control unit 106 may include a first calculation unit 106-1, a second calculation unit 106-2, a moving speed determining unit 106-3, and a focus location correcting unit 106-4.

The first calculation unit 106-1, the second calculation unit 106-2, the moving speed determining unit 106-3, and the focus location correcting unit 106-4 of the control unit 106 as shown in FIG. 1B may correspond to one processor or may correspond to a plurality of processors, respectively. A processor may be embodied as an array of a plurality of logic gates or a combination of a general-purpose microprocessor, and a memory having stored thereon a program that may be executed by the microprocessor. Furthermore, a processor may be embodied as any of various other types of hardware.

The first calculation unit 106-1 performs a first focus detection by detecting a phase difference of a still image captured during a first image capture operation in a continuous photographing mode for continuously capturing still images. Here, since the imaging device 108 includes phase difference detecting pixels, focus detection may be performed by detecting a phase difference even while a still image is being captured.

The second calculation unit 106-2 may perform a second focus detection by detecting a phase difference of a still image captured during a second image capture operation in the continuous photographing mode.

The moving speed determining unit 106-3 determines an object's moving speed based on results of the first focus detection and the second focus detection.

The focus location correcting unit 106-4 predicts location of the object based on the determined object moving speed and drives the focusing lens 102, thereby correcting a focal point in a next image capture operation in the continuous photographing mode.

Therefore, even when using an image plane phase difference AF in a continuous photographing mode, the control unit 106 controls the imaging device 108 to not to perform focus detection at phase difference detecting pixels by displaying a live-view image. Instead, when still images are to be captured, the control unit 106 controls detection of a phase difference at phase difference detecting pixels, the motion prediction of an object, and driving of the focusing lens 102 to a location at which the object is focused. As a result, images may be continuously captured at a high speed while a moving object is focused.

Furthermore, the control unit 106 may control the imaging device 108 not to display a live-view image and may use an image captured by the imaging device 108 as an afterview image.

Therefore, the digital image processing apparatus 100 according to another embodiment may focus on a moving object during high-speed continuous image capture.

Operations of the digital image processing apparatus 100 and the control unit 106 according to an embodiment will be described below in detail with reference to the attached drawings. Any description given below may be applied to the digital image processing apparatus 100 and the control unit 106 as shown in FIGS. 1A and 1B.

Figure 2:
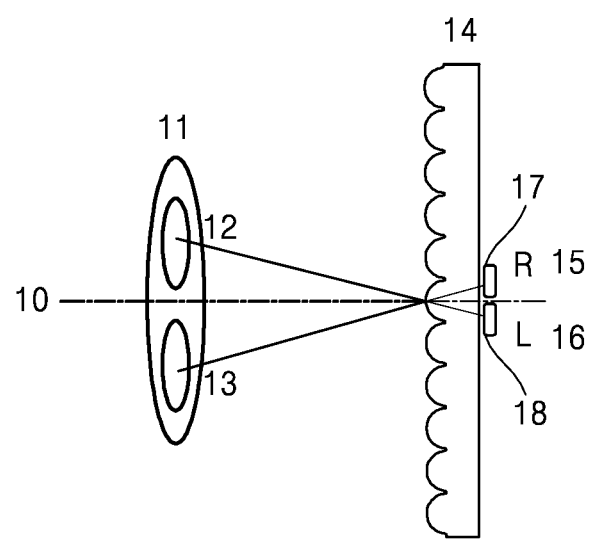
FIG. 2 is a diagram illustrating the mechanism of phase difference detecting pixels using the imaging device of FIG. 1A, according to an embodiment.

FIG. 2 is a diagram illustrating the mechanism of phase difference detecting pixels using the imaging device 108 of FIG. 1A, according to an embodiment.

An object's light transmitted through the imaging lens 11 passes through a micro lens array 14 and is guided to light receiving pixels R 15 and L 16. Light screens 17 and 18 or limited apertures for limiting pupils 12 and 13 from the imaging lens 11 are arranged at portions of the light receiving pixels R 15 and L 16. Furthermore, light from the pupil 12 above the optical axis 10 of the imaging lens 11 is guided to the light receiving pixel L 16, whereas light from the pupil 13 below the optical axis 10 of the imaging lens 11 is guided to the light receiving pixel R 15. Guiding lights inversely projected at the pupils 12 and 13 by the micro lens array 14 to the light receiving pixels R and L 15 and 16 is referred to as pupil division.

Continuous outputs of the light receiving pixels R 15 and L 16 by pupil division by the micro lens array 14 exhibit a same shape, but exhibit different phases with respect to location. The reason thereof is that image formation locations of light from the eccentrically formed pupils 12 and 13 of the imaging lens 11 are different from each other. Therefore, when focus points of light from the eccentrically formed pupils 12 and 13 are inconsistent with each other, the light receiving pixels R 15 and L 16 exhibit different output phases. On the other hand, when focus points of light from the eccentric pupils 12 and 13 are consistent with each other, images are formed at a same location. For example, in a front focus state, the phase of the output of the light receiving pixel R 15 is shifted further to the left than that in the focused phase, and the phase of the output of the light receiving pixel L 16 is shifted further to the right than that in the focused phase. In contrast, a back-focusing indicates that an object is in a back focus state. In this case, the phase of the output of the light receiving pixel R 15 is shifted further to the right than that in the focused phase, and the phase of the output of the light receiving pixel L 16 is shifted further to the left than that in the focused phase. The shift amount between the phases of the light receiving pixels R 15 and L 16 may be converted to a deviation amount between the focuses.

Figure 3:
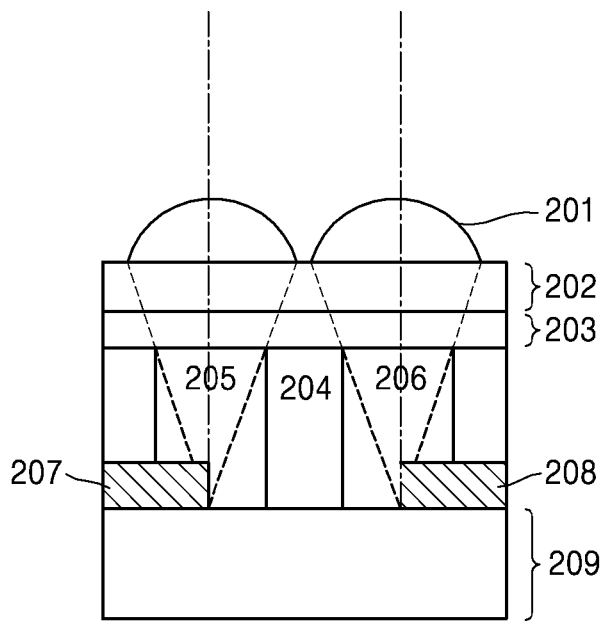
FIG. 3 is a diagram illustrating a vertical pixel configuration of a phase difference detecting pixel, according to the related art.

FIG. 3 is a diagram illustrating a vertical pixel configuration of a phase difference detecting pixel, according to the related art. For convenience of explanation, FIG. 3 shows that a R column pixel and a L column pixel are arranged adjacent to each other. Unlike the related art, however, embodiments of the invention is not limited thereto. Referring to FIG. 3, a micro lens 201, a surface layer 202, a color filter layer 203, a wiring layer 204, photo diode layers 205 and 206, and a substrate layer 209 are shown. The structure shown in FIG. 3 is simplified than an actual layer structure. Light from an object passes through the micro lens 201 and arrives at a photo diode layer of each pixel. As light is received, electrons are generated by a photo diode, and the electrons become pixel information. The electrons generated by the photo diode may be output by the wiring layer 204. Light incident from an object is the entire light flux passed through the exit pupil of an imaging lens, and brightness information regarding locations of the object may be acquired based on locations of pixels. The color filter layer 203 generally employs three colors including red (R), green (G), and blue (B). As an occasion demands, the color filter layer 203 may employ three colors including cyan (C), magenta (M), and yellow (Y). Next, a light blocking film is arranged at an aperture of an imaging device to acquired signals from the R column and the L column. The structure may include the photo diode layers 205 and 206, a R column light blocking film 207, and a L column light blocking film 208. However, locations of light blocking films are not limited to those shown in FIG. 3, and light blocking layers may be located at any of various locations between a lens and a photo diode.

Figure 4:
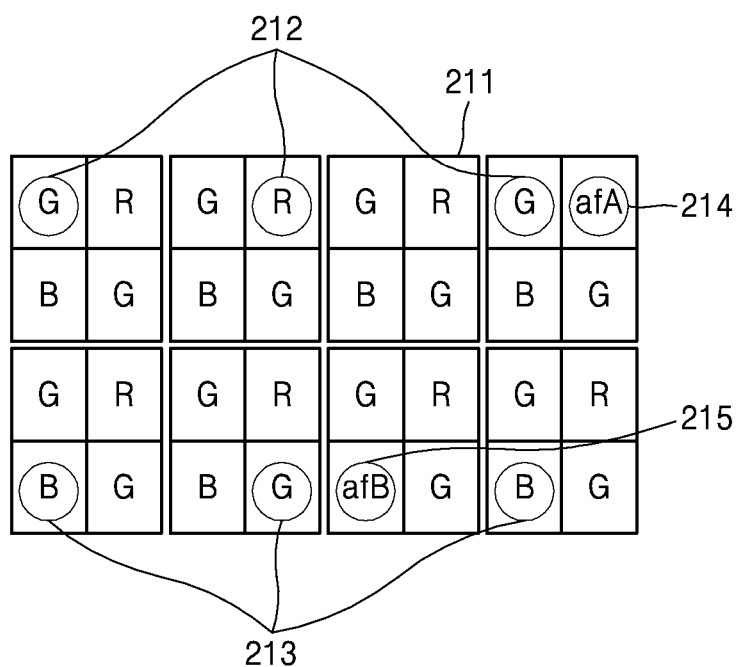
FIG. 4 is a diagram illustrating an arrangement of phase difference detecting pixels of a portion of an imaging device.

FIG. 4 is a diagram illustrating an arrangement 211 of phase difference detecting pixels of an imaging device.

Referring to FIG. 4, in a pixel based on Bayer arrangement using RGB color filters, the RGB color filters include red, green, and blue filters. When displaying a live-view image, G, R pixels 212 and B, G pixels 213 are read out. In other words, only sampled pixels from all imaging pixels are read out. Meanwhile, the phase difference detecting pixels shown in FIG. 3 are indicated as afA 214 and afB 215 and are arranged nearby each other. Therefore, from among phase difference detecting pixels of each column, 8 pixels, 12 pixels, or 24 pixels are corresponded to a R column and a L column of FIG. 2 as a unit and are used for correlation calculation described above with reference to FIG. 2.

When displaying a live-view image, phase difference detecting pixels are read out independently from common pixel columns. Therefore, after common pixels are read out, only the phase difference detecting pixels are read out. However, during an image capture operation, the phase difference detecting pixels are also sequentially read out in the same way as the common pixels are read out.

Figure 5:
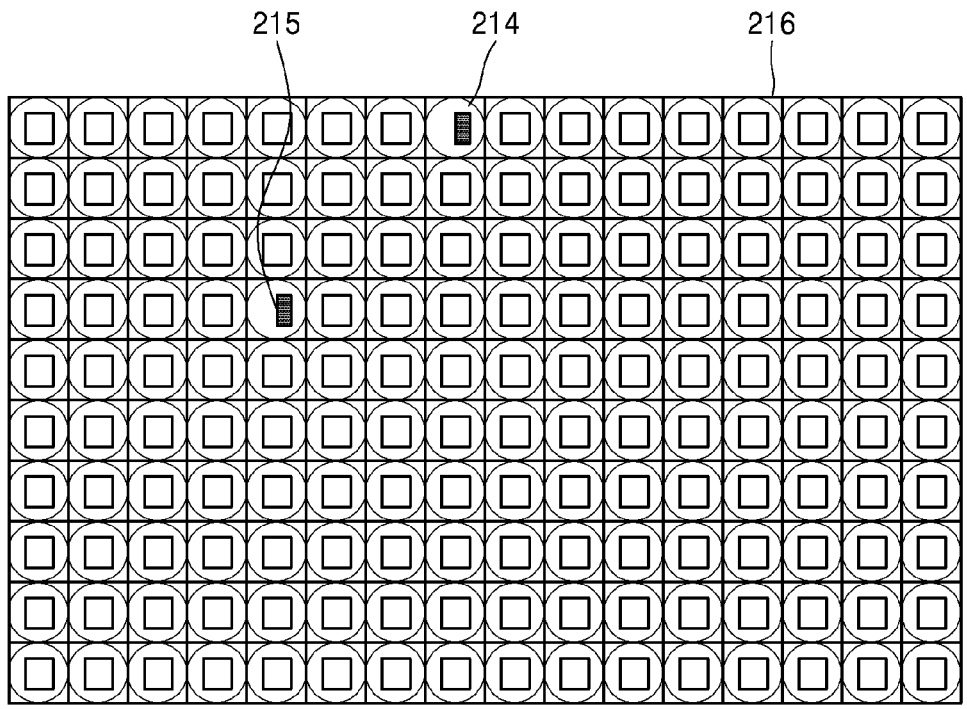
FIG. 5 is a diagram illustrating an arrangement of phase difference detecting pixels capable of detecting horizontal phase differences.

FIG. 5 is a diagram 216 illustrating an arrangement of phase difference detecting pixels capable of detecting horizontal phase differences.

Referring to FIG. 5, the phase difference detecting pixels afA 214 and afB 215 become units of pixels for detecting horizontal phase differences. FIG. 5 shows a case in which one set of phase difference detecting pixels is arranged with respect to 160 pixels. Therefore, phase difference detecting pixels may be arranged at the same ratio with respect to all pixels of the entire imaging device.

Figure 6:
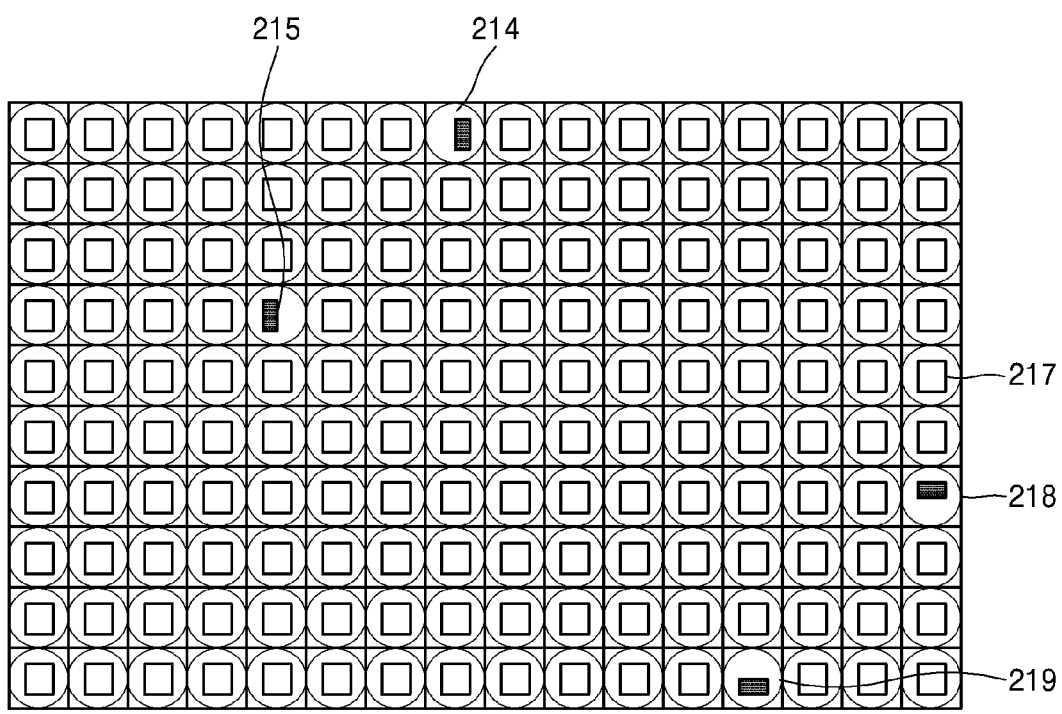
FIG. 6 is a diagram illustrating an arrangement of phase difference detecting pixels in which one set of phase difference detecting pixels is arranged in each direction for detecting horizontal and vertical phase differences.

FIG. 6 is a diagram 217 illustrating an arrangement of phase difference detecting pixels in which one set of phase difference detecting pixels is arranged in each direction for detecting horizontal and vertical phase differences.

Referring to FIG. 6, the horizontal phase difference detecting pixels afA 214 and afB 215 and vertical phase difference detecting pixels afC 218 and afD 219 may be arranged in 160 pixels.

The arrangement enables detection of phase differences in horizontal and vertical directions.

Figure 7:
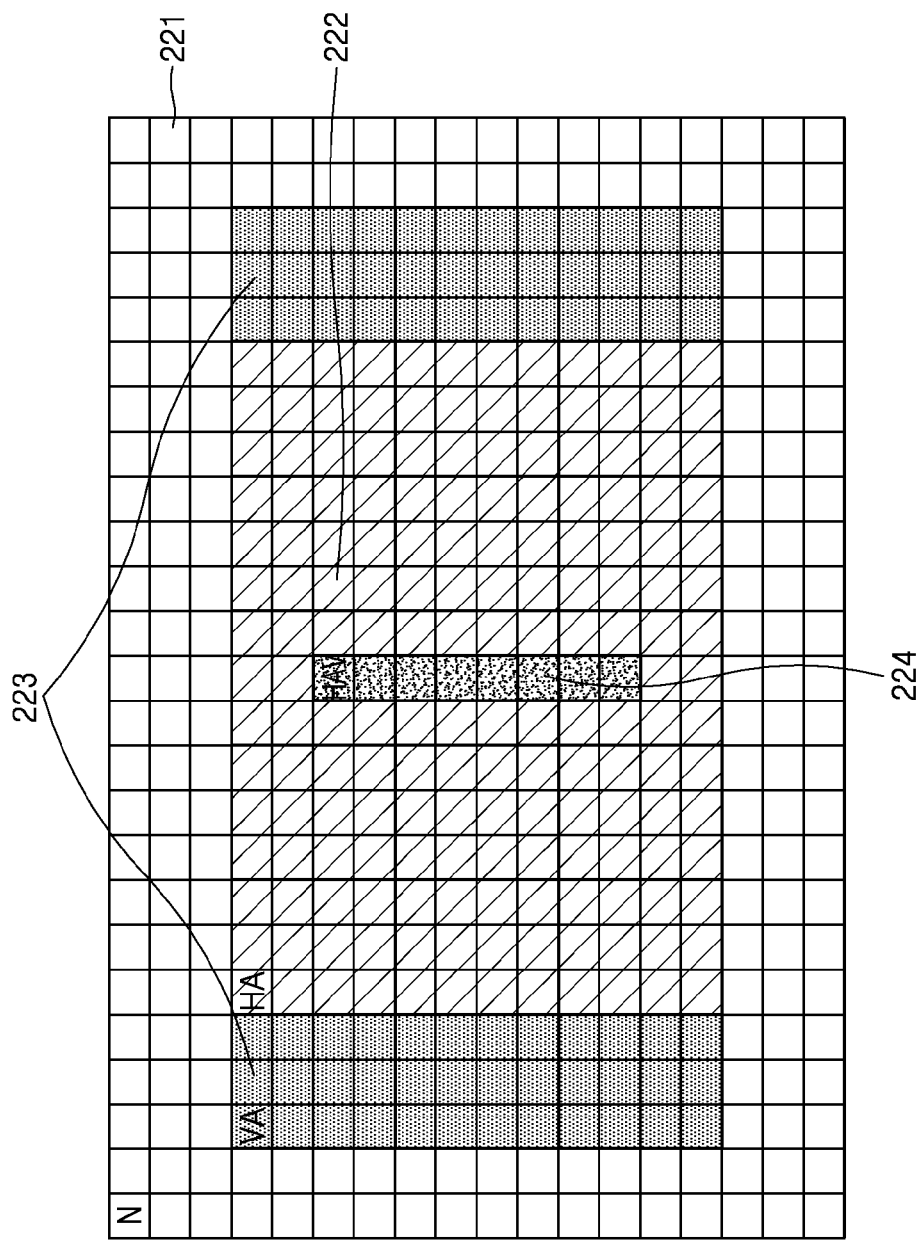
FIG. 7 is a diagram illustrating the entire imaging device.

FIG. 7 is a diagram illustrating the entire imaging device.

Referring to FIG. 7, an imaging device includes a horizontal detecting region 222 for detecting the horizontal phase difference, a vertical detecting region 223 for detecting the vertical phase difference by arranging the phase difference detecting pixels described above with reference to FIG. 5 in a vertical direction, and a cross detecting region 224 for detecting the horizontal and vertical phase differences as described above with reference to FIG. 6. A region 221 other than the regions 222, 223, and 224 include common imaging pixels only.

On the other hand, contrast AF may be calculated in any of the above-stated regions. As shown in FIG. 7, by arranging phase difference detecting regions in a plurality of patterns, phase difference may be calculated with respect to an object having various contrast distributions in horizontal or vertical directions. For example, when performing phase difference AF, AF may be performed by extracting location of a main object by using a main object determining algorithm in a phase difference detecting region. Particularly, in the case of a moving object, AF may be performed with respect to a large area, and thus the object may be continuously tracked. Furthermore, focused still images may be continuously obtained during a continuous image capture operation.

Figure 8:
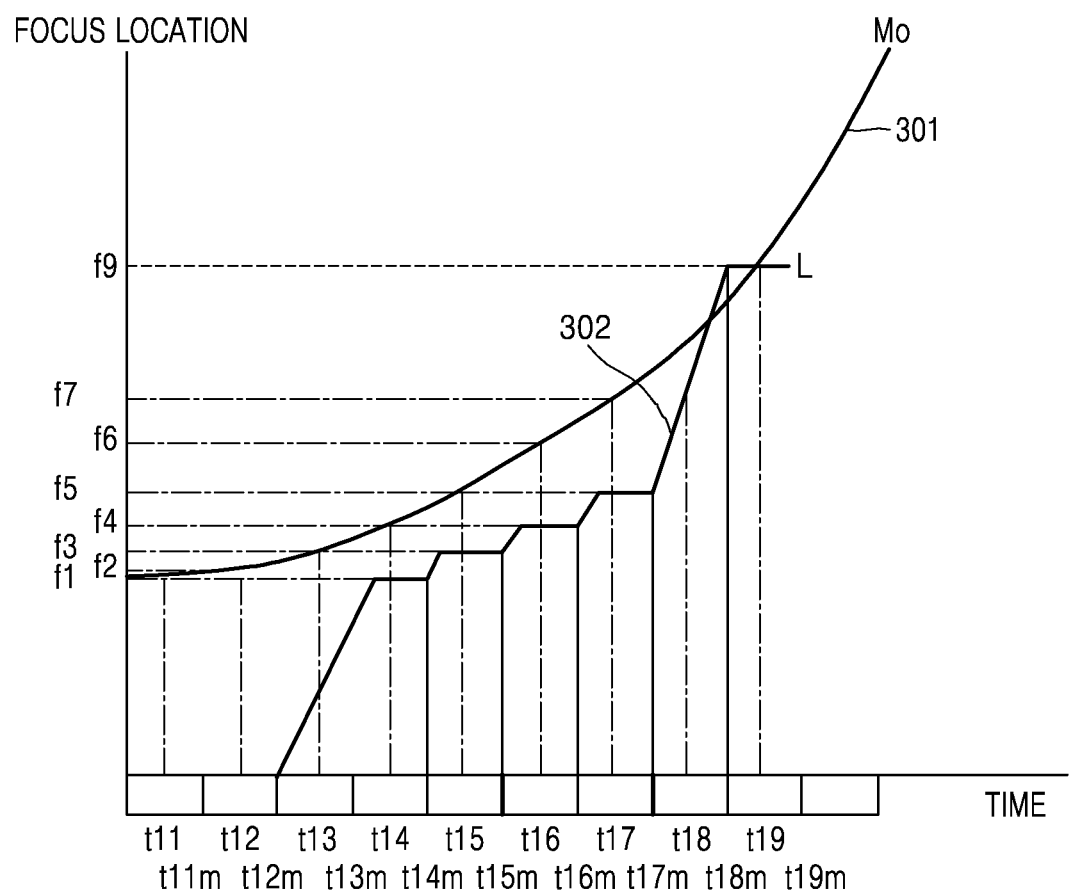
FIG. 8 is a diagram illustrating a method of detecting a moving object during a continuous image capture operation using phase difference AF method.

FIG. 8 is a diagram illustrating a method of detecting a moving object during a continuous image capture operation using phase difference AF method. In FIG. 8, the horizontal axis indicates time, and a box at the horizontal axis indicates one cycle of focus detection performed by the digital image processing apparatus 100. The vertical axis indicate location of a focusing lens of an imaging lens, where the origin indicates the infinity and location of the focusing lens becomes closer upward. The time points t11 through t19 on the broken lines are time points corresponding to initiations of exposure and focus detection at an imaging device. To be more specific, the time points t11 through t19 indicate the centers of exposure times. Here, since it is assumed that an imaging device is a CMOS sensor using rolling shutter drive, the imaging device is continuously exposed. However, a time point contributing to focus detection is a time point at which phase difference detecting pixels in an AF region are exposed. In other words, the time points t11 through t19 indicate time points at which the center portion of the AF region is exposed.

Referring to FIG. 8, information regarding focus location detected during an exposure at a time point t11 may be obtained at a time point t12m. Here, the focus location may be f1. Next, a focusing lens is driven from the time point t12m toward f1. While the focusing lens is being driven, a focus is detected during an exposure at a time point t13, and focus location f3 corresponding to the time point t13 may be obtained.

When the focusing lens is initially driven, the focusing lens is stopped at f1, and exposure and focus detection begin at a time point t14. Here, a focus location f4 is obtained at a time point t15m.

Since a new result of focus detection obtained at a time point t14m is f3, the focusing lens is driven to the focus point f3 from a time point t14m. Although a focus location f2 corresponding to a time point t12 is not used in the above embodiment, the focus location f2 may also be used.

Next, at a time point t15, exposure and focus detection are performed. Next, when the focusing lens is driven at the time point t15m, the focusing lens is moved to f4 based on a result of focus detection at the time point t14. In this regard, AF operation is repeatedly performed.

In FIG. 8, when an object is a moving object, a curve 301 indicates a location of the moving object on an image plane based on actual movement of the object, whereas a straight line 302 shows a location of a focusing lens on the image plane. In other words, if an object is a moving object, it is difficult to focus at the object at f3, f4, f5, and f6, and defocus amount continuously increases. Therefore, it is clear that moving object correction is necessary for a moving object.

Therefore, for a moving object correction according to an embodiment, a moving object moving speed may be obtained and movement of the moving object may be predicted, thereby correcting a focal point. The operation is referred to as a moving object correction based on a moving object prediction.

First, to obtain object moving speed, it is necessary to measure information regarding focal points of an object and time points corresponding to the focal points. For example, if the focal point is shifted from f1 to f2 between the time points t11 and t12, the object moving speed may be calculated according to [Equation 1] below.

$$Sv1=(f1-f2)/(t12-t11) \qquad \text{[Equation 1]}$$

Here, speed of a closing-in object may be calculated by setting the value of a lens at the infinity location to 0 and setting the value of the lens at a nearby location to a positive value. There are two methods for obtaining object moving speed: a method for obtaining object moving speed on the image plane of a lens, and a method for obtaining object moving speed on a side surface of an object. Either method may be used. Furthermore, if an object is moving at a relatively slow speed, speed of the object on the image plane of a lens may be approximated to a constant speed.

Furthermore, in consideration of focus detection deviation, hand shake, and slow object moving speed, speeds calculated for a plurality of number of times may be averaged as described below.

First, like that in Equation 1 above, speeds of a moving object during focus detections for a plurality of number of times may be calculated according to [Equation 2] below.

$$Sv2=(f2-f3)/(t13-t12) \quad \text{[Equation 2]}$$

Next, as shown in [Equation 3] below, the speeds calculated during the focus detections for the plurality of number of times may be averaged.

$$Sv=(Sv1+Sv2)/2 \quad \text{[Equation 3]}$$

Next, when the object moving speed Sv is calculated, movement of the moving object is predicted and moving object correction is performed. For example, to correct a focus location of a next exposure and focus detection, a period of time from a time point at which focus detection data may be obtained to a time point at which a lens is driven to the next focus location is indicated by T, and a focusing lens driving correction amount ΔR may be calculated according to [Equation 4] below.

$$\Delta R=Sv*T \quad \text{[Equation 4]}$$

For example, object moving speed Sv at a time point t17m may be calculated as Sv5=(f5-f6)/(t16-t15), and the lens driving correction amount may be calculated as ΔR=Sv5*(t19-t17m). Therefore, a focusing lens is driven for moving object correction by the lens driving correction amount ΔR at the time point t17m.

In the same regard, in a case where a shutter button is completely pressed and released, a correction amount ΔR may be calculated with respect to a time T corresponding to a delay time from a time point t at which the latest focus detection data is obtained and a time point corresponding to the release, that is, a release time lag. In other words, the correction amount ΔR may be calculated according to Equation 4 above. Therefore, a focus location Rx at the time point of the release may be obtained, and thus a moving object prediction AF for driving a focusing lens to the focus location may be performed.

Meanwhile, if moving speed of an object is faster, [Equation 5] below may be used.

When a focal distance in front of an imaging lens is indicated by f, a focal distance behind the imaging lens is indicated by f', a distance from a front focus location to an object is indicated by d, a distance between a rear focus location behind the imaging lens is indicated by z, and a location of the image plane when the object is approaching toward a camera at a constant speed is indicated by Z(t), Z(t) may be expressed as shown [Equation 5] below.

$$Z(t) = \frac{ff'}{d - \frac{dz}{dt}t} \quad \text{[Equation 5]}$$

Furthermore, [Equation 6] may be obtained via second order approximation of a value of Z(t).

$$Z(t)=At_2+Bt+C \quad \text{[Equation 6]}$$

Here, moving object prediction AF may be performed during a continuous photographing operation by inputting a period of time $t_x$ until a time point for obtaining a next focus detection evaluation value to t. Also, moving object prediction AF at a shutter-release may be performed by applying release time lag time T to t.

Figure 9:
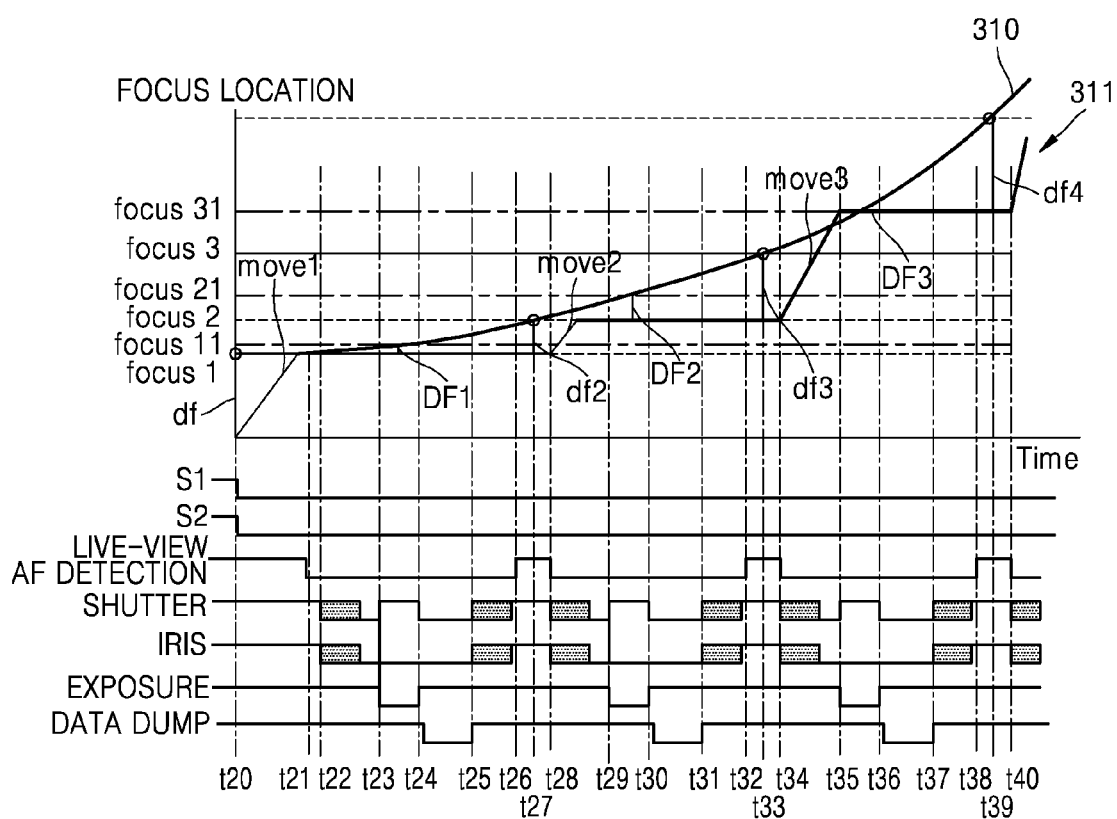
FIG. 9 is a diagram illustrating a sequence of performing a moving object prediction AF during a continuous image capture operation using image plane phase difference AF method.

FIG. 9 is a diagram illustrating a sequence of performing a moving object prediction AF during a continuous image capture operation using image plane phase difference AF method.

FIG. 9 is a diagram showing moving object prediction AF in a low-speed continuous photographing mode in which focus locations are detected using image plane phase difference AF in a live-view image while the live-view image is being displayed in the continuous photographing mode. Here, the low-speed continuous photographing mode refers to a continuous photographing mode in which a smaller number of images are continuously captured, because a live-view image is displayed between image captures.

The horizontal axis indicates time, and the vertical axis indicates locations of a focusing lens. A curve 310 shows a location of a moving object on an image plane based on actual movement of the object, whereas a straight line 311 shows a location of a focusing lens on the image plane.

The timing diagram shown in FIG. 9 includes S1 signal (low indicates ON), S2 signal (low indicates ON), live-view and focus detection (High indicates ON and focus may be detected), shutter (High indicates exposure ON), iris (low indicates small aperture, high indicates large aperture), exposure (low indicates exposure state), and data dump (low indicates that imaging device data is being read) from above in the order stated.

The timing diagram shown in FIG. 9 indicates a state that a shutter-release button of the digital image processing apparatus 100 is completely pressed (that is, S1 and S2 signals are ON at the same time).

First, AF is initiated as S1 and S2 are turned ON. Here, even if a shutter-release button is not pressed before S1 and S2 are turned ON, there may be a S0 state in which only a main switch that repeatedly performs focus detections may exist. Therefore, by using a result of the focus detections, a focusing lens is driven from a time point t20 toward focus1 via move1. When the focusing lens is moved to focus1 at a time point t21, live-view is turned off at the time point t21 and preparation for an image capture operation begins. From a time point t22, a normally open shutter is closed and an aperture is adjusted. As the preparation is finished, the shutter is opened from a time point t23, an imaging device is exposed, and the shutter is closed again at a time point t24. Next, information regarding the imaging device is read out during a data dump period between the time point t24 and a time point t25.

After the information regarding the imaging device is read out, the shutter is re-opened at the time point t25, and the aperture is opened again. Next, at a time point t26, the live-view is turned back ON, and exposure and focus detection may be performed again. Here, if information regarding focus detection may be obtained at a time point t27, the live-view is turned off again at a time point t28 and a preparation for an image capture operation begins. During the preparation for an image capture operation, a focusing lens is driven toward focus2 via move2 by using a result of focus detection df2 obtained at the time point t27.

Meanwhile, although a focusing lens is driven using only a result of focus detection when a live-view image is displayed at the time point t27 is described above, a result of focus detection DF1 at a previous image capture at a time point t23 may also be used for driving a focusing lens. In this case, the reliability may be increased by using the average of the results.

Focus detections are repeatedly performed during continuous image captures as described above. Next, an object moving speed Sv3 is calculated using a result of focus detection df3 obtained at a time point t33 and a result of focus detection df2 obtained at the time point t27. Here, the equation for calculating the object moving speed Sv3 is Sv3=(focus2-focus3)/(t33-t27).

Meanwhile, an object moving speed Sv2 may be further calculated using focus1 and information regarding the time point t20 and averaged. Furthermore, precision of the object moving speed Sv3 may be improved by calculating an object moving speed Sv21 or Sv31 by dividing a time period into finer time points based on information regarding focus11 or focus21 and averaging the object moving speed Sv21 or Sv31.

Furthermore, from a time point t34, a moving object prediction AF, that is, a focus operation move3 for moving object correction is performed during a focus operation during a preparation for an image capture operation. The correction amount ΔR3 of move3 is set such that an object is focused at a time point t35. In other words, a focus location focus31 may be obtained via prediction calculation.

The correction amount ΔR3 may be calculated according to an equation ΔR3=Sv3*(t35−t33).

Here, a focus operation amount is df3+ΔR3. Hereinafter, moving object correction focus operation is performed in the same regard during a continuous photographing operation.

Figure 10:
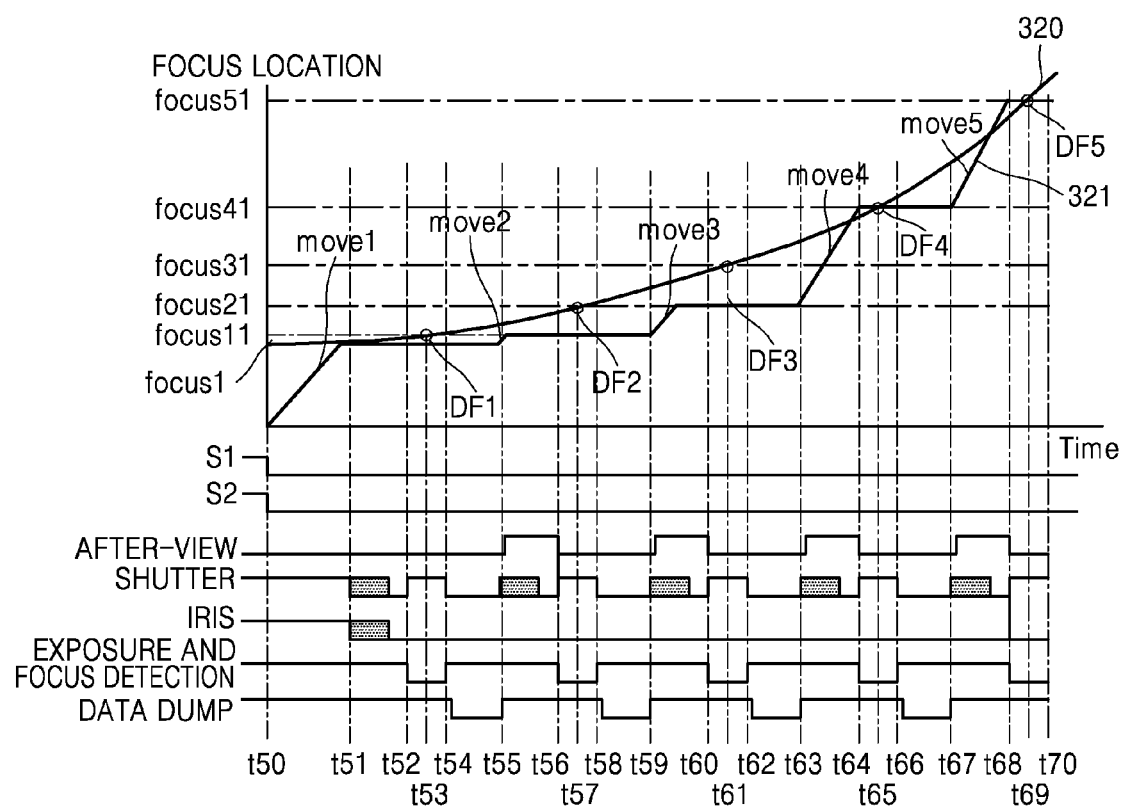
FIG. 10 is a diagram illustrating a sequence of performing a moving object prediction AF in an image plane phase difference AF mechanism, where focus detection is performed by detecting phase differences of still images captured during a continuous photographing operation, according to an embodiment.

FIG. 10 is a diagram illustrating a sequence of performing a moving object prediction AF in an image plane phase difference AF mechanism, where focus detection is performed by detecting phase differences of still images captured during a continuous photographing operation, according to an embodiment.

FIG. 10 shows a moving object prediction AF in a high-speed continuous photographing mode in which focus is detected in a captured still image using image plane phase difference AF instead of performing image plane phase difference AF while a live-view image is being displayed. Here, the high-speed continuous photographing mode refers to a mode in which a large number of images are captured continuously.

In this mode, displaying of a live-view image may be omitted and captured images may be displayed as after-view image.

Referring to FIG. 10, the horizontal axis indicates time, whereas the vertical axis indicates location of a focusing lens. It is assumed that an object is a moving object. The curve 320 indicates locations of the moving object on an image plane, and the straight line 321 indicates locations of the focusing lens on the image plane.

The timing diagram shown in FIG. 10 shows a S1 signal (low indicates ON), a S2 signal (low indicates ON), an after-view (high indicates that display is ON), a shutter (high indicates that exposure is ON), an iris (low indicates that aperture is narrowed to an appropriate degree, high indicates that aperture is open), exposure and focus detection (low indicates that pickup, exposure, and focus detection may be performed simultaneously), and data dump (low indicates that data is being read from image sensor) from above in the order stated.

According to an embodiment, FIG. 10 shows that a camera release button is completely pressed (S1 and S2 switches are ON at the same time).

First, AF begins as S1 and S2 are ON. Here, even if a release button is not pressed before S1 and S2 are turned ON, there may be a state S0 in which only a main switch is ON and focus detection is being repeatedly performed. Therefore, by using a result thereof, a focusing lens is driven from a time point t50 toward focus1 via move1. When the focusing lens reaches the focus1, preparation of an image capture operation begins at a time point t51. From the time point t51, a shutter, which is normally open, is closed, and an aperture is adjusted. When the preparation of the image capture operation is completed, the shutter is opened at a time point t52, an imaging device is exposed, and the shutter is closed again at a time point t54.

In the mode shown in FIG. 10, phase difference information for focus detection may be simultaneously obtained at a time point t53 during the exposure. Next, during or after a data dumping period, focus detection is performed. Therefore, DF1 may be obtained as a result of the focus detection at the time point t53, where location of a moving object at the time point t53 is focus11.

Next, during a data dumping period from a time point t54 to a time point t55, data is read out from the imaging device. By using a result of focus detection obtained here, the focusing lens is driven from a time point t55 toward the focus11 via move2. Furthermore, from the time point t55, an after-view for displaying a result of an image capture operation is initiated, and a shutter is charged. When the charging is completed, the shutter is opened and the imaging device is exposed from a time point t56.

At a time point t57, information for focus detection during the exposure is obtained. Next, the shutter is closed again at a time point t57. Next, during a data dumping period from a time point t58 to a time point t59, data is read out from the imaging device. Here, DF2 may be obtained as a result of the focus detection at the time point t57, where location of the moving object at the time point t57 is focus21. In this regard, focus detections during continuous image captures are repeated, and DF3 may be obtained as a result of focus detection when location of the moving object is focus31. Therefore, the focusing lens is driven toward focus31 via move3.

Next, location of a moving object may be calculated based on a result DF2 of focus detection obtained at a time point t61, location of the focusing lens at the time point t61, a result DF3 of focus detection obtained at the time point t57, and location of the focusing lens at the time point t57. Speed Sv3 of the moving object may be calculated as shown below.

$$Sv3=(focus21-focus31)/(t61-t57)$$

Here, averaging may be performed by calculating a speed Sv2 of the moving object using information corresponding to focus11 and the time point t53, and speed of the moving object at an object side or an image plane side may be calculated.

Next, a focusing drive move4 for moving object correction from a time point t63 will be described. Here, an amount of correction drive ΔR4 of the move4 is set to focus at a time point t65 for a next image capture. In other words, a focus location focus41 is obtained via moving object prediction calculation. Here, an equation for calculating an amount of correction is ΔR4=Sv3*(t65−t61), and thus amount of focusing drive may be obtained from DF3+ΔR4.

Meanwhile, a moving object prediction AF according to the above embodiment may be repeatedly performed during a continuous image capture operation.

Figure 11:
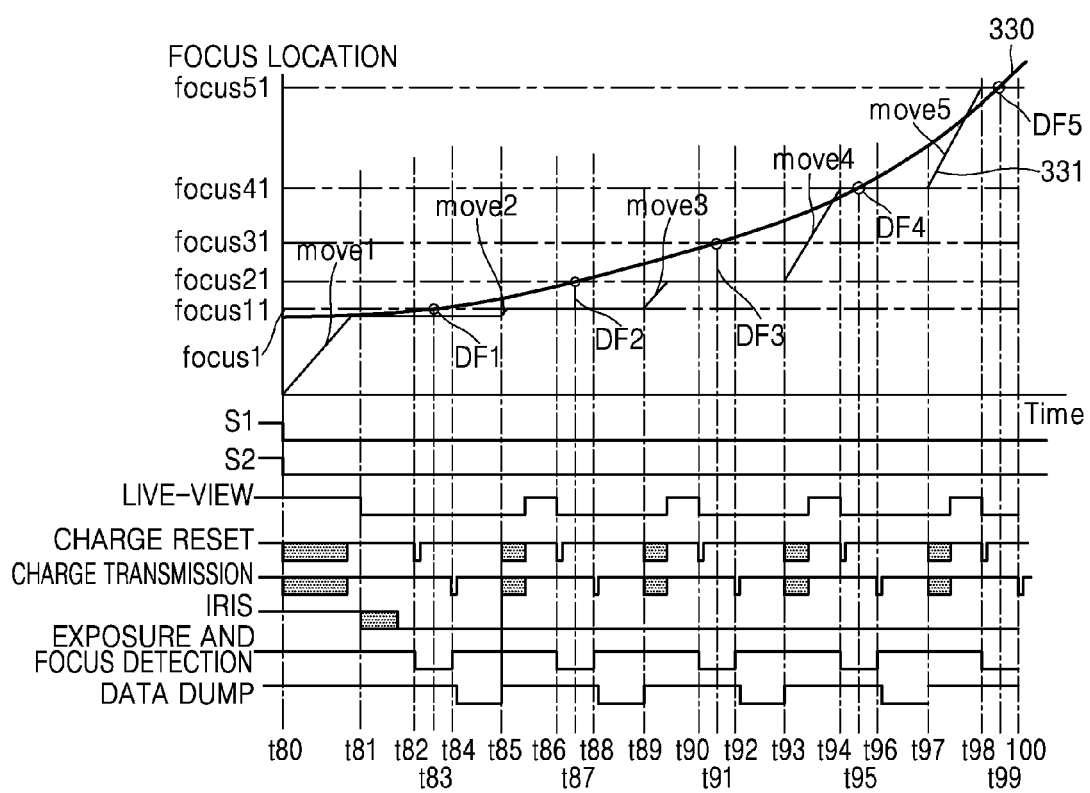
FIG. 11 is a diagram illustrating a sequence of performing a moving object prediction AF in an image plane phase difference AF mechanism, where focus detection is performed by detecting phase differences of still images captured during a continuous image capture operation, according to an embodiment.

FIG. 11 is a diagram illustrating a sequence of performing a moving object prediction AF in an image plane phase difference AF mechanism, where focus detection is performed by detecting phase differences of still images captured during a continuous image capture operation, according to an embodiment.

Since the moving object prediction AF shown in FIG. 11 is similar to the moving object prediction AF described with reference to FIG. 10, descriptions below will focus on differences therebetween.

The difference from the embodiment shown in FIG. 10 is that no mechanical shutter is arranged and global shutter function of an imaging device is used. Therefore, according to the present embodiment, images may be captured at a high speed while live-view images are being displayed.

Since no mechanical shutter is arranged, it is not necessary to charge shutter. In other words, exposure may be initiated just by resetting charges at photo diodes of an imaging device. Furthermore, exposure may be terminated just by transmitting charges photoelectrically converted via photo diodes to an accumulating unit.

In the timing diagram shown in FIG. 11, the fourth timing signal (Charge Reset) from the S1 signal indicates that a charge reset signal is ON (low indicates reset ON and high indicates charge accumulation), whereas the fifth timing signal (Charge Transmission) from the S1 signal indicates that a charge transmission signal is ON (low indicates transmission ON and high indicates charge maintenance).

When a live-view image is displayed, the two above-stated signals are combined, and image signals are read out along the horizontal axis by performing charge accumulation and charge transmission and are displayed on a display unit. At the same time, AF may be performed by detecting focus by using phase difference detecting pixel signals included in live-view image signals.

During a period of time from a time point t80 to a time point t81, live-view images are displayed and a focusing lens is driven toward focus1. When the focusing lens is located at focus1, preparation for release begins from the time point t81. Here, the preparation includes aperture adjustment. Next, when a charge reset signal is ON at a time point t82, charges of photo diodes of an imaging device are reset, thereby initiating exposure. Next, charges photoelectrically converted via the photo diodes are transmitted to an accumulating unit at a time point t84, thereby completing exposure. Meanwhile, focus detection is performed by using signals output by phase difference detecting pixels during an exposure between the time point t82 and the time point t84, thereby obtaining a focus detection result DF1. Here, focus is detected at a time point t83. Next, pixel data is read out from the time point t84 to a time point t85, and a live-view image is displayed between the time point t85 and a time point t86.

However, the invention is not limited thereto, and an after-view image may be displayed as described above with reference to FIG. 10 instead of live-view image.

In the same regard, DF2 may be obtained at a time point t87 and DF3 may be obtained at a time point t91. Furthermore, an object moving speed may be obtained from a result of focus detection, and correction amount may be obtained via a moving object prediction calculation. As a result, the digital image processing apparatus may focus on the DF4 from FIG. 10 using the correction amount as described above with reference to FIG. 10. Furthermore, phase difference detecting pixel signals may be obtained from live-view information, and df2, df3, and df4 may be obtained via focus detection using the phase difference detecting pixel signals. Therefore, by performing an object moving speed calculation and moving object correction calculation based on df2, df3, and df4 as described above, a moving object prediction AF may become more reliable than a calculation using DF1, DF2, and DF3 only.

Hereinafter, referring to FIGS. 12 and 13, a relationship between image capture timings of a camera and locations of a focusing lens during continuous image capture operation in the related art is described, thereby describing a difference from motion prediction AF based on image plane phase difference AF during continuous image captures of the digital image processing apparatus 100 according to the embodiment as described above with reference to FIGS. 10 and 11 in detail.

Figure 12:
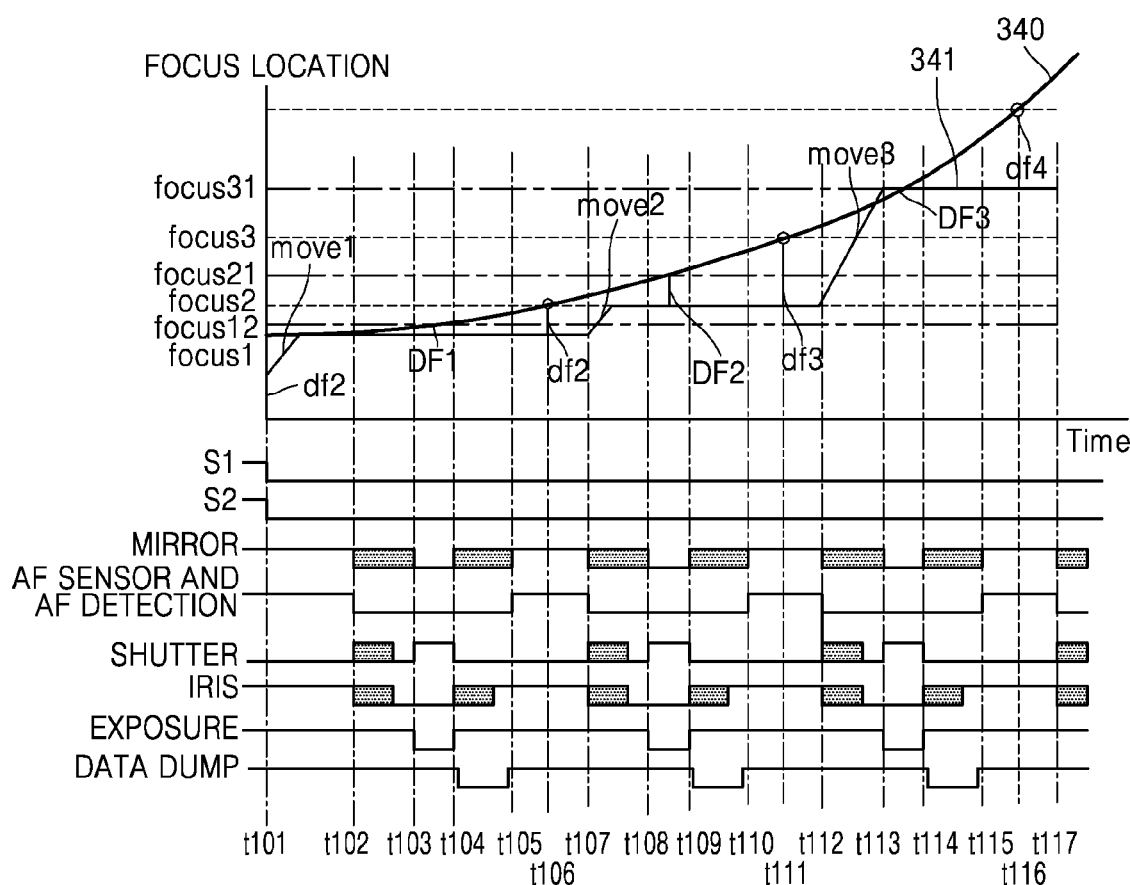
FIG. 12 is a diagram illustrating a relationship between timings of a camera and locations of a focusing lens during continuous image captures of a digital image processing apparatus, according to the related art.

FIG. 12 is a diagram showing a relationship between timings of a camera and locations of a focusing lens during continuous image captures of a digital image processing apparatus in the related art. AF is performed by using a phase difference AF module that is separately arranged. The digital image processing apparatus includes a main mirror and a sub mirror for reflecting a light toward the AF module. Therefore, only when a mirror is located at a designated location, may focus be detected via the phase difference AF module. Meanwhile, a prism-type optical finder may also be arranged.

Referring to FIG. 12, the horizontal axis indicates time, whereas the vertical axis indicates location of a focusing lens. It is assumed that an object is a moving object. A curve 340 indicates location of the moving object on an image plane, whereas a straight line 341 indicates location of the focusing lens on the image plane. The chart indicates S1 signal (low indicates ON), S2 signal (low indicates ON), a mirror (low indicates a status without a mirror; images may be captured herefrom; high indicates that AF may be performed), an AF sensor and AF detection (High indicates that AF may be performed), shutter (High indicates exposure ON), iris (low indicates small aperture, high indicates large aperture), exposure (low indicates exposure state), and data dump (low indicates that imaging device data is being read) from above in the order stated.

FIG. 12 shows a status in which a shutter-release button of a camera is fully pressed (both S1 and S2 switches are simultaneously ON).

First, AF begins as S1 and S2 signals are ON. Here, even if a shutter-release button is not pressed before the S1 and S2 signals are ON, there may be a status S0 in which only a main switch for repeatedly performing focus detections is pressed. Therefore, based on the result, a focusing lens is driven toward focus1 from a time point t101 via move1. Next, when the focusing lens arrives at focus1, an image capture preparation begins from a time point t102. From the time point t102, a main mirror and a sub mirror for reflecting a light toward an AF module are driven to not reflect light toward the AF module. When the mirrors do not reflect light toward the AF module, it is impossible to perform focus detection, and nothing may be displayed through the finder. Meanwhile, it is impossible to perform focus detection for a time period in which an AF sensor and an AF detection signal are low, that is, from the time point t102 to a time point t105. A DSLR generally uses an open shutter. For an image capture preparation, shutter is charged from the time point t102. Next, an iris is controlled, and the image capture preparation is completed. Next, a shutter is opened and an imaging device is exposed in a time point t103, and then the shutter is closed again in a time point t104. Next, data is read out from the imaging device during a data dump period from the time point t104 to the time point t105. Meanwhile, when exposure is completed, the mirrors return between the time point t104 and the time point t105, and thus focus detection may be performed. Therefore, focus detection is performed from the time point t105 to a time point t107, and a focus detection result df2 regarding a moving object's location focus2 on an image plane is detected. Here, the focus detection result df2 is obtained at a time point t106. Next, based on the focus detection result df2, a focusing lens is driven toward the moving object's location focus2 from the time point t107 via move2. The driving operation may be performed simultaneously as a next image capture preparation is performed.

Next, in the same regard, a focus detection result df3 regarding a moving object's location focus3 may be obtained by repeatedly performing focus detections during continuous image captures.

Next, based on the focus detection result df2, the moving object's location focus2 corresponding thereto, the focus detection result df3, and the moving object's location focus2 corresponding thereto, an object moving speed Sv3 may be determined, and an amount of moving object correction drive ΔR3 may be calculated.

In other words, Sv3=(focus2−focus3)/(t111−t106). Here, a case in which a lens is located at the infinite distance may be indicated as 0 and a case in which a lens is located at a near distance may be indicated as a positive number, thereby indicating an object's moving speed toward a near location as a positive number. Therefore, a focus drive move3 for moving object correction is performed from a time point t112, thereby driving the focusing lens to a location at which the moving object is focused. Here, the amount of moving object correction drive ΔR3 is set to focus at a next image capture time point t113. In other words, a focused location focus31 is obtained via an estimation-calculation. For example, ΔR3=Sv3*(t113−t111). Therefore, an amount of focus drive move3 is df3+ΔR3.

However, in the related art as described above, it is necessary to operate a mirror for focus detection. In other words, when performing continuous image captures without AF, the time period from the time point t105 to the time point t107 is not necessary. However, when performing continuous image captures with AF, a time period for driving mirrors is necessary, and thus limits the speed of continuous image captures.

Figure 13:
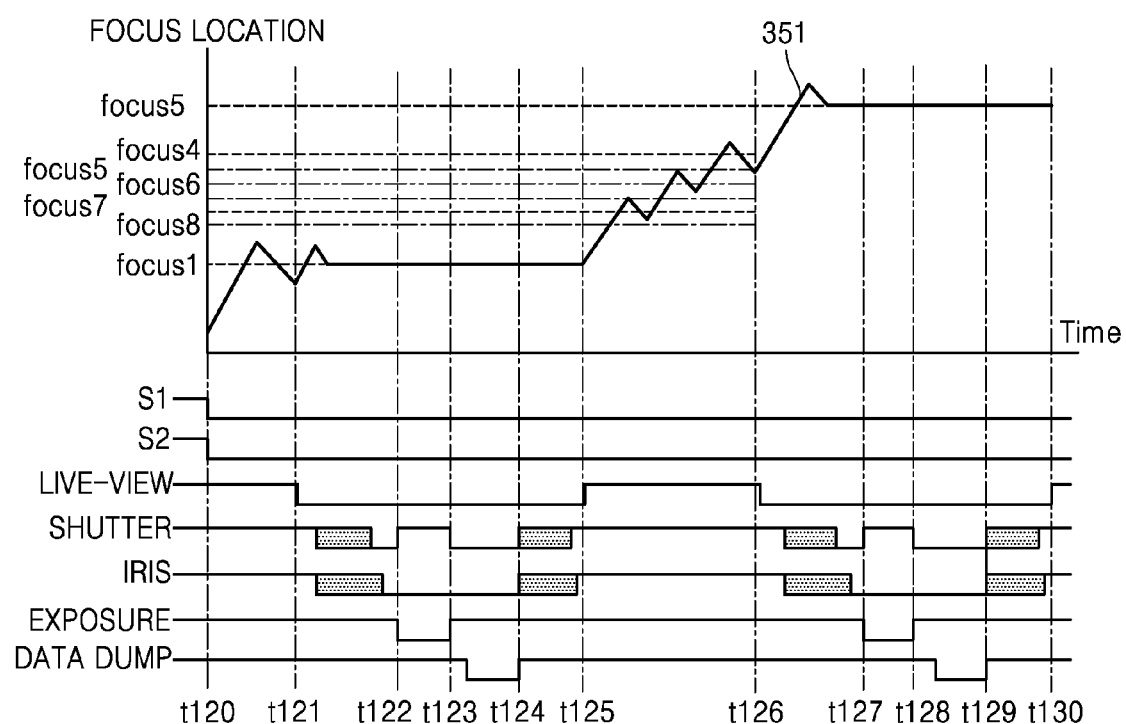
FIG. 13 is a diagram illustrating a relationship between timings of a camera and locations of a focusing lens during continuous image captures of a mirror-less camera, according to the related art.

FIG. 13 is a diagram showing a relationship between timings of a camera and locations of a focusing lens during continuous image captures of a mirrorless camera, according to the related art. Contrast AF using outputs of imaging pixels may be used. The contrast AF method is a method for detecting a contrast peak location by driving a focusing lens and determining the peak location as a focused location, where it is necessary to drive the focusing lens a plurality of number of times.

Referring to FIG. 13, the horizontal axis indicates time, whereas the vertical axis indicates location of a focusing lens. It is assumed that an object is a moving object.

Although FIG. 13 does not show the location of the moving object on an image plane, it is assumed that the moving object is moving from the far distance to the near distance, and thus focus location is moving from focus1 to focus 5 as time passes. Furthermore, a straight light 351 indicates location of the focusing lens on the image plane.

The chart shows a S1 signal (low indicates ON), a S2 signal (low indicates ON), live-view (when the live-view signal indicates high which indicate a display output, and focus may be detected using the output), shutter (high indicates exposure ON), iris (low indicates completion of iris adjustment, and high indicates that iris is opened), exposure (low indicates exposure state), and data dump (low indicates that imaging device is being read) from above in the order stated.

FIG. 13 shows a status in which a shutter-release button of a camera is fully pressed (both S1 and S2 switches are simultaneously ON).

First, AF begins as S1 and S2 are ON. From a time point t120, a focusing lens is driven to find a contrast peak. When location focus1 of a moving object on the image plane is found, the focusing lens is reversely driven once, and the detailed location thereof is detected. Next, the focusing lens is driven for backlash correction. The focusing lens is driven repeatedly for at least 4 times to set focus at focus1. Next, image capture preparation is performed. Meanwhile, FIG. 13 shows a case in which focusing lens is driven for backlash correction during the image capture preparation.

From a time point t121, a normally open shutter is closed and an aperture is adjusted. As the image capture preparation is finished, the shutter is opened from a time point t122, an imaging device is exposed, and the shutter is closed again at a time point t123.

Next, information regarding the imaging device is read out during a data dump period between the time point t123 and a time point t124. After the information regarding the imaging device is read out, the shutter is re-opened at the time point t124, and the aperture is opened again. Next, at a time point t125, the live-view is turned back ON, and exposure and focus detection may be performed again. During a time period between the time point t125 and a time point t126, contrast AF is repeated for 3 times, thereby finding 3 contrast peaks. For example, peak locations focus2, focus3, and focus4 are found. Focus locations and a moving object's speeds at each corresponding time point of the 3 peak locations are calculated. When a moving object's speed is calculated, a moving object correction calculation is performed at a next image capture time point t127, and moving object prediction AF is performed from the time point t126 to the time point t127. By repeating the above-stated operations, moving object prediction AF may be performed in contrast AF of a mirrorless camera in the related art.

However, even if a mirrorless camera with contrast AF is capable of performing moving object prediction AF, a live-view period from the time point t125 to the time point t126 is necessary for detecting focus and a moving object's speed, and thus limiting the speed of continuous image captures.

Hereinafter, operations of the digital image processing apparatus 100 according to an embodiment will be described in detail with reference to FIGS. 14 through 17.

Figure 14:
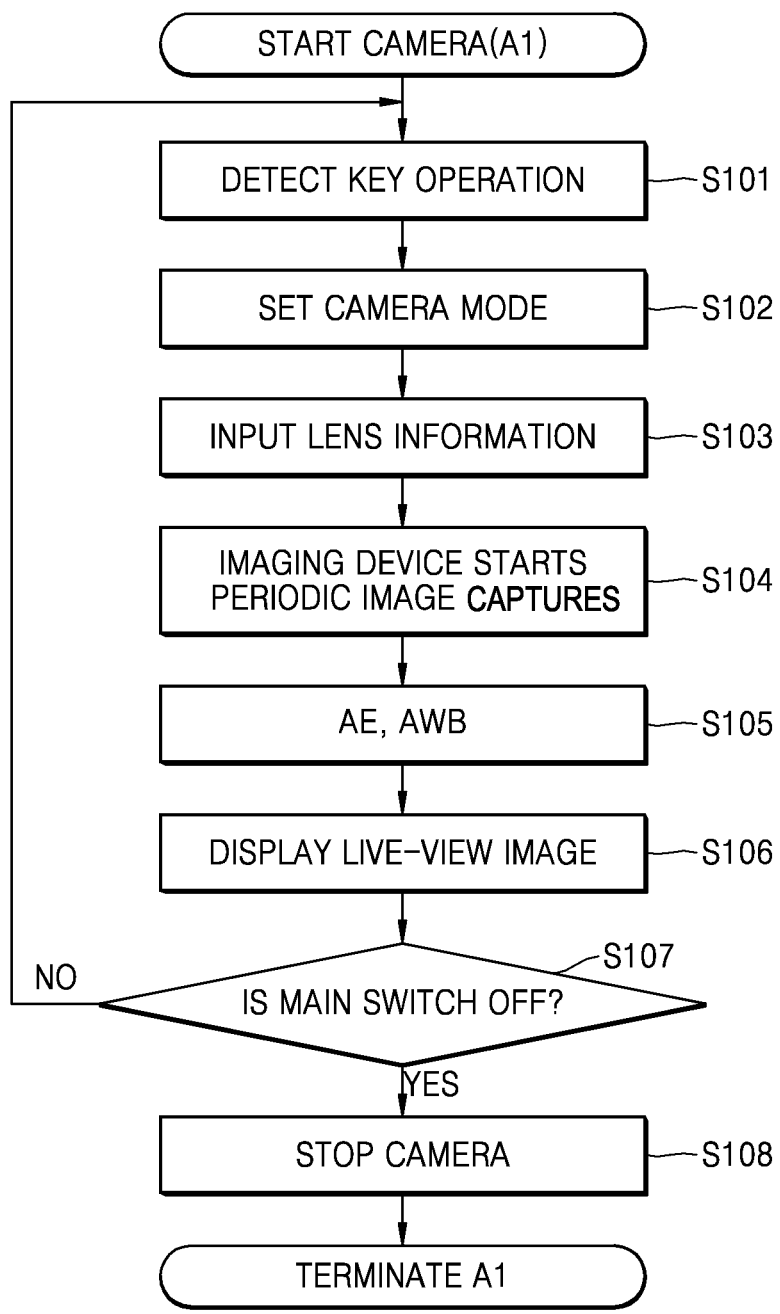
FIG. 14 is a flowchart illustrating an operation for starting a digital image processing apparatus, according to an embodiment.

FIG. 14 is a flowchart showing an operation for starting the digital image processing apparatus 100, according to an embodiment.

When the main switch of the digital image processing apparatus 100 is turned on and the digital image processing apparatus 100 is started, a key operation is detected in an operation S101. Next, an operation regarding a mode dial or a menu setup is detected in an operation S102.

In an operation S103, lens information for operating the digital image processing apparatus 100 is received from an exchangeable lens. Here, the lens information is information for performing AF, AE, AWB, and image quality control from among parameters of the exchangeable lens, stored in a lens memory inside the lens control unit 105.

Next, when a shutter-release switch is half-pressed (S1), AF begins.

In an operation S104, the imaging device 108 begins periodic image captures.

In an operation S105, a light is received and calculations for AE and AWB are performed.

Next, in an operation S106, a live-view image is displayed.

In an operation S107, it is determined whether the main switch is turned off. If the main switch is not turned off, the method proceeds back to the operation S101 and the live-view displaying operation is repeated. On the other hand, if the main switch is turned off, the method proceeds to an operation S108 and operation of the digital image processing apparatus 100 is terminated. As a result, the operation A1 of the digital image processing apparatus 100 is terminated.

Figure 15:
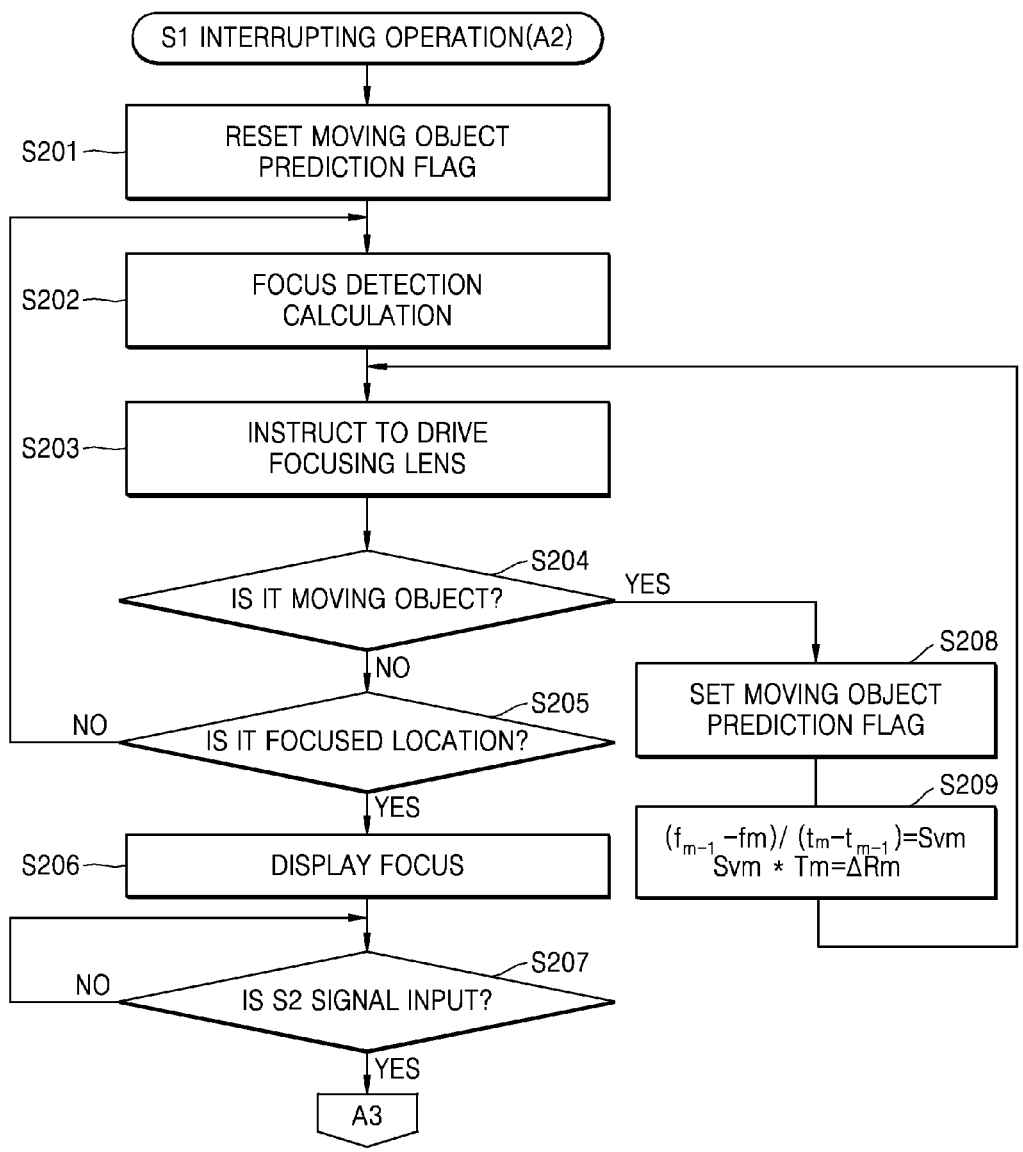
FIG. 15 is a flowchart illustrating an interrupt operation of a digital image processing apparatus, according to an embodiment.

Meanwhile, if the shutter-release button is half-pressed (S1 is on) while a live-view image is being displayed, a S1 interrupting operation A2 described below with reference to FIG. 15 is performed.

FIG. 15 is a flowchart showing the S1 interrupting operation A2 of the digital image processing apparatus 100, according to an embodiment.

In an operation S201, a moving object prediction flag for future determination is reset.

In an operation S202, image plane phase difference focus detection is performed. Here, focus detection may be performed based on image plane phase difference outputs included in a live-view image.

Next, in an operation S203, a focusing lens drive instruction is output.

Next, in an operation S204, it is determined whether an object is a moving object in the same regard as described above with reference to FIG. 8. If the object is not a moving object, the method proceeds to an operation S205, and it is determined whether a focusing lens is located at a focused location. If the focusing lens is not at the focused location, the method proceeds back to the operation S202 and focus detection calculation and focusing lens drive are repeated.

Meanwhile, if the object is a moving object, a focused image might not be captured by only determining whether the focusing lens is located at a focused location in the operation S205. In other words, the focused lens does not refer to a peak location of a focus, but refers to a focus location during a focused detection.

In the operation S205, if it is determined that the focusing lens is located at a focused location, the method proceeds to an operation S206 and focus is displayed. Next, the method proceeds to an operation S207, which waits until a signal indicating the shutter-release button is fully pressed (S2 ON) is input.

Meanwhile, if it is determined that the object is a moving object in the operation S204, the method proceeds to an operation S208 and a moving object prediction flag is set up. The moving object prediction flag is used after S2 is ON.

Next, in an operation S209, an object's moving speed Svm is calculated. The object's moving speed Svm may be calculated via the equation shown below.

$$Svm=(f_{m-1}-f_m)/(t_m-t_{m-1}).$$

Here, $f_{m-1}$ denotes a previous location of a moving object on an image plane, $f_m$ denotes the current location of a moving object on the image plane, $t_{m-1}$ denotes a time point at which $f_{m-1}$ is obtained, and tm denotes a time point at which $f_m$ is obtained.

Next, a correction amount ΔRm to a next focus detection location may be calculated via the equation shown below.

$$\Delta Rm=Svm*Tm$$

Here, Tm denotes a time period from the time point $t_m$ to a time point corresponding to a next focus detection. Moving object correction via AF of the digital image processing apparatus 100 according to an embodiment is designed for moving object correction at a time point corresponding to a next focus detection during continuous image captures.

Figure 16:
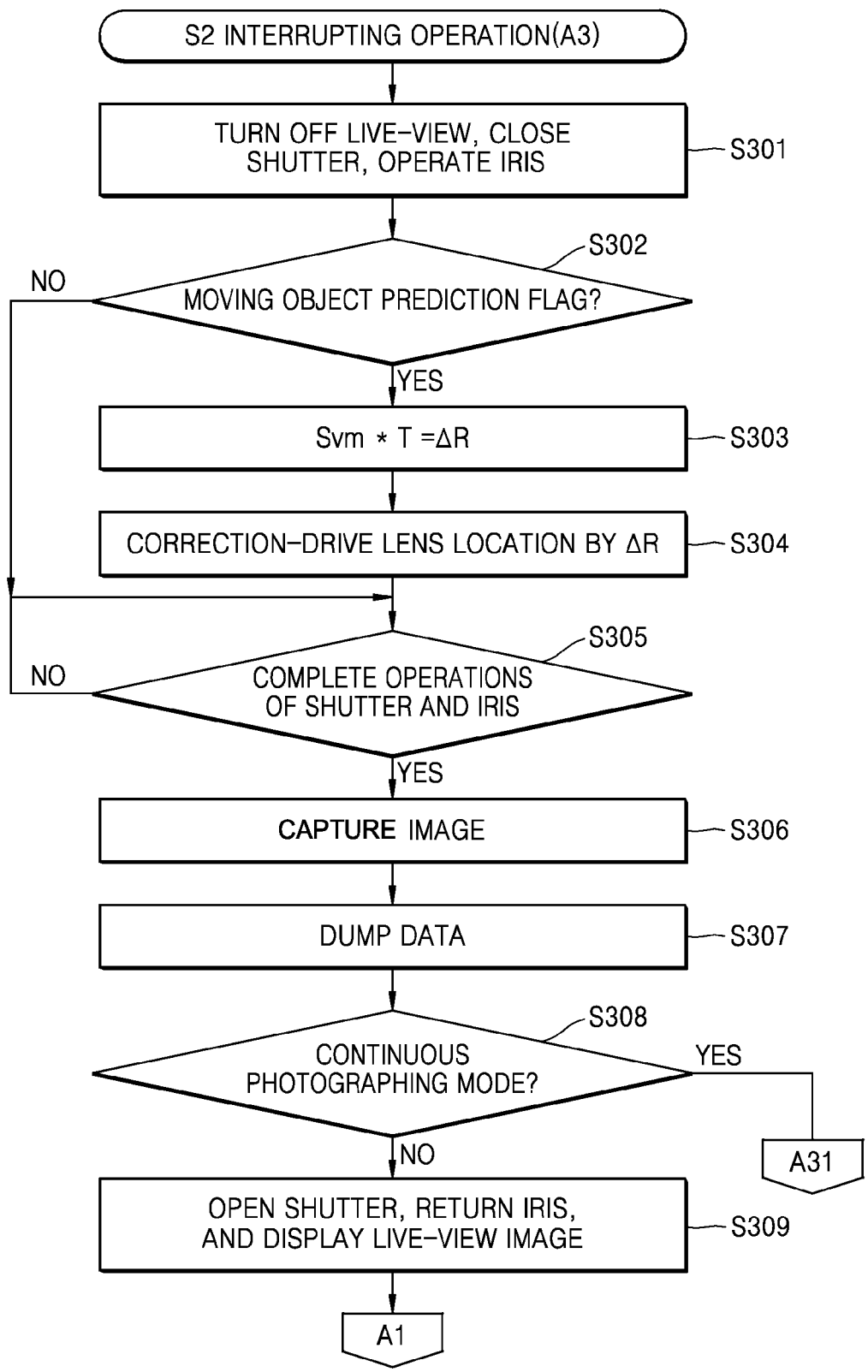
FIG. 16 is a flowchart illustrating another interrupting operation of a digital image processing apparatus, according to an embodiment.

Meanwhile, while AF is being performed while S1 is ON, if the shutter-release button is fully pressed (S2-ON), a S2 interrupting operation A3 as shown in FIG. 16 is initiated.

FIG. 16 is a flowchart showing the S2 interrupting operation A3 of the digital image processing apparatus 100, according to an embodiment.

If a shutter-release button is fully pressed from the beginning (S1 and S2 are ON), a focused location is detected, a focusing lens is driven to the focused location, and then the S2 interrupting operation A3 is performed.

Referring to FIG. 16, in an operation S301, display of a live-view image is stopped, and a shutter is closed to screen an imaging device from a light. Here, when the shutter is closed, the shutter is simultaneously charged.

Meanwhile, when using the global shutter as shown in FIG. 11, it is not necessary to perform any operation at this point. Alternatively, the global shutter may perform only an operation for preparatorily resetting a photo diode. At the same time, an operation for adjusting iris of a lens to an appropriate value corresponding to a brightness of an object is performed.

Next, in an operation S302, it is determined whether a moving object prediction flag is set. If the moving object prediction flag is set, the method proceeds to an operation S303 and a moving object correction amount ΔR for a release time lag T is calculated. Here, the moving object correction amount may be obtained via the equation shown below.

$$\Delta R=Svm*T$$

Here, Svm denotes the newest speed of the moving object obtained until the shutter-release button is fully pressed (S2 ON). Next, the method proceeds to an operation S304 and a focusing lens is driven to a moving object predicted location obtained by correcting a focus detection result DFn with the moving object correction amount ΔR.

If the moving object prediction flag is not set in the operation S302, moving object correction is omitted, and the method proceeds to an operation S305.

In the operation S305, it is determined whether shutter and iris preparations are completed. The driving time in the operation S304 is set to be shorter than the time period for the shutter and iris preparations. However, if the driving time becomes longer than the shutter and iris preparations, it may be simultaneously determined whether the drive in the operation S304 is completed. Meanwhile, if an imaging device uses a global shutter, no shutter preparation is necessary, and thus it may be determined only whether the drive in the operation S304 is completed.

When a focusing lens correction drive or operations of a shutter and an iris are completed, the method proceeds to an operation S306 and exposure is performed. In other words, an image capture operation is performed. The exposure refers to an operation for opening the shutter, receiving an object light via the imaging device for a designated time period corresponding to brightness of the object, and closing the shutter again. A global shutter performs an exposure for a designated time period by resetting charges and transmitting charges.

In an operation S307, data dump for reading out image information regarding the object corresponding to the received light from the imaging device is performed.

Via the above-stated operations, a still image is captured. Next, in an operation S308, it is determined whether the digital image processing apparatus 100 is in a continuous photographing mode. If the digital image processing apparatus 100 is in a continuous photographing mode, an operation A31 is performed.

If the digital image processing apparatus 100 is not in a continuous photographing mode, the method proceeds to an operation S309, where the shutter is re-opened and a live-view image is displayed. Therefore, an image capture operation is terminated. After the image capture operation is terminated, the method proceeds back to the operation A1.

Figure 17:
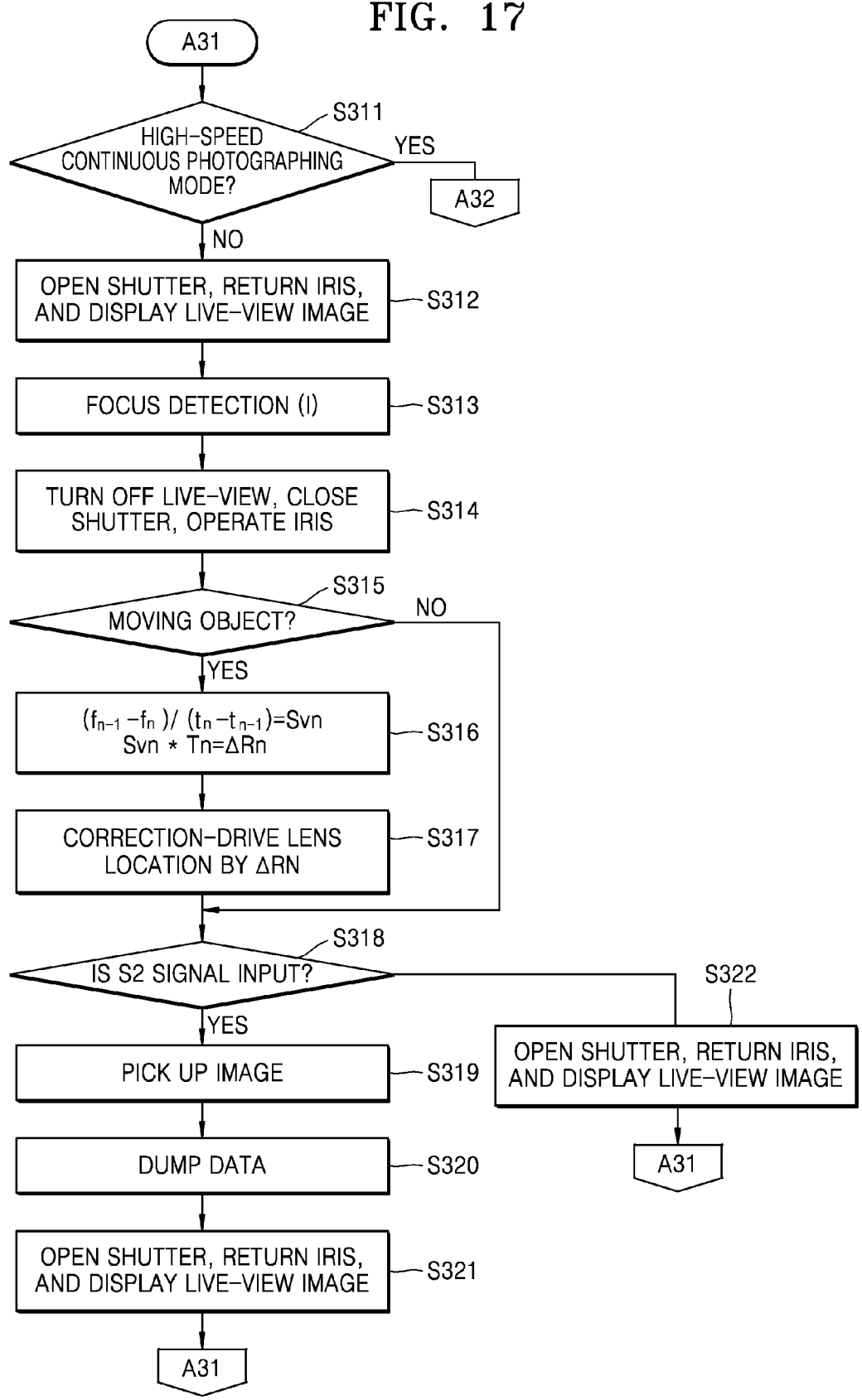
FIG. 17 is a flowchart illustrating an operation performed when a digital image processing apparatus according to an embodiment is in a continuous photographing mode.

FIG. 17 is a flowchart showing an operation A31 performed in case where the digital image processing apparatus 100 according to an embodiment is in a continuous photographing mode.

Figure 18:
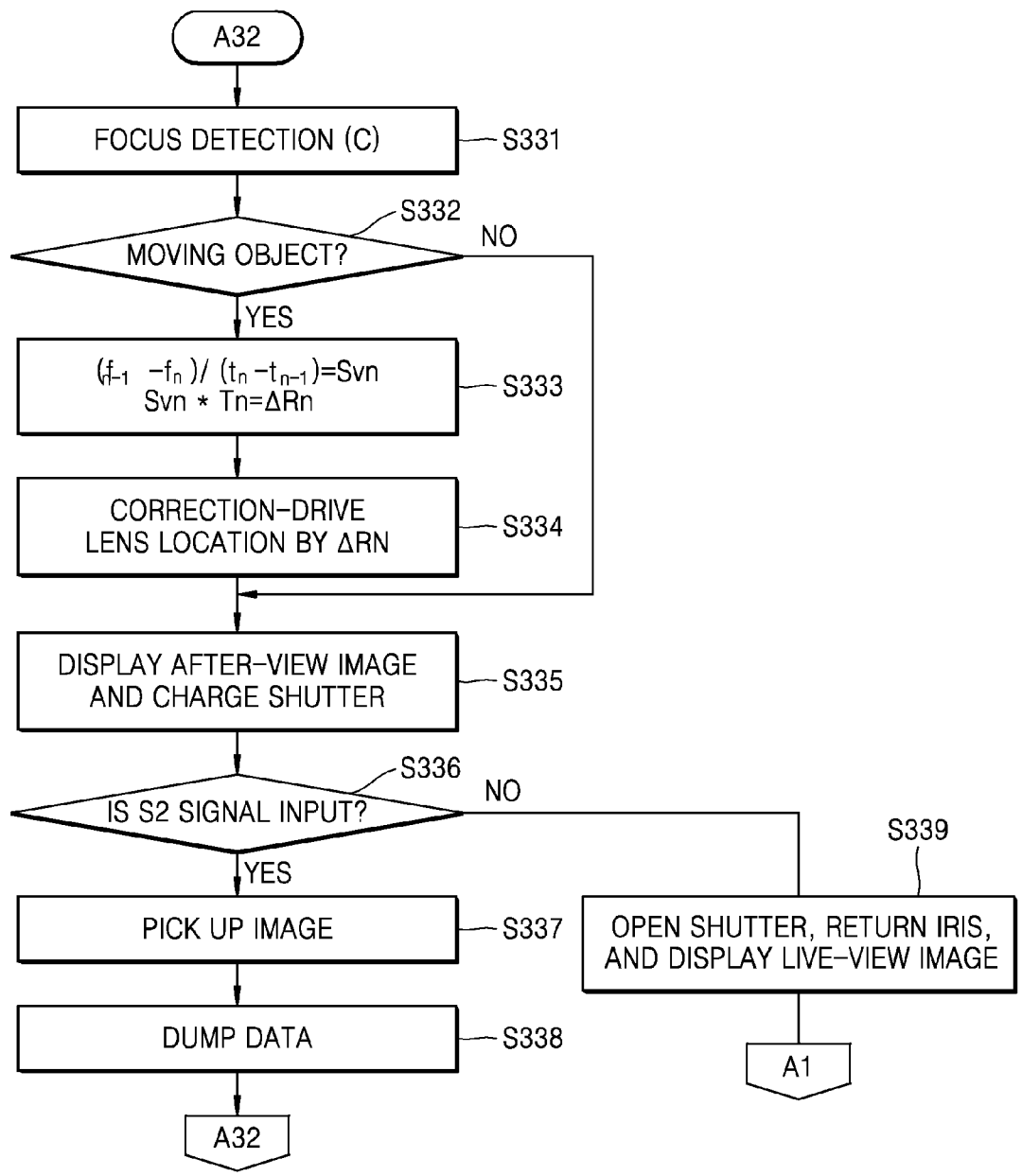
FIG. 18 is a flowchart illustrating an operation performed when a digital image processing apparatus according to an embodiment is in high-speed continuous photographing mode.

In an operation S311, it is determined whether the digital image processing apparatus 100 is in a high-speed continuous photographing mode. If the digital image processing apparatus 100 is in a high-speed continuous photographing mode, an operation A32 as described below with reference to FIG. 18 is performed. If the digital image processing apparatus 100 in a low-speed continuous photographing mode, the method proceeds to an operation S312, in which a shutter is re-opened, an iris is returned, and a live-view image is displayed. As a result, a previous image capture operation is terminated.

In an operation S313, focus is detected based on phase difference detecting pixel information obtained from a live-view image.

Hereinafter, for convenience of explanation, focus detection while a live-view image is being displayed is referred to as a focus detection (I). Meanwhile, after phase difference information for focus detection is obtained, display of a live-view image is turned OFF and the shutter is closed for screening an imaging device from a light in an operation S314. When the shutter is closed, the shutter is simultaneously charged. At the same time, an operation for adjusting iris of a lens to an appropriate value corresponding to brightness of an object is performed. When employing a global shutter, however, no shutter preparation is necessary.

In an operation S315, it is determined whether the object is a moving object. If it is determined that the object is a moving object, the method proceeds to an operation S316, in which an object's moving speed Svn is calculated via the equation shown below.

$$Svn=(f_{n-1}-f_n)/(t_n-t_{n-1}).$$

Here, $f_{n-1}$ denotes a previous location of a moving object on an image plane, $f_n$ denotes the current location of a moving object on an image plane, $t_{n-1}$ denotes a time point at which $f_{n-1}$ is obtained, and $t_n$ denotes a time point at which $f_n$ is obtained.

Next, a correction amount ΔRn to a next focus detection location may be calculated via the equation shown below.

$$\Delta Rn=Svn*Tn$$

Here, Tn denotes a time period from $t_n$ to a time point corresponding to a next focus detection.

Next, location of a focusing lens is correction-driven by ΔRn during an image capture operation in an operation S317.

If it is determined that the object is not a moving object in the operation S315, the method proceeds to an operation S318. In the operation S318, it is determined whether S2 of the shutter-release button is continuously ON. If S2 of the shutter-release button is continuously ON, an image capture operation is performed in an operation S319, and the object's image data is read out by performing data dump in an operation S320.

Next, the method proceeds to an operation S321, in which the shutter is opened, the iris is returned, and a live-view image is displayed. Next, the method proceeds back to the operation A31.

Meanwhile, in case of a global shutter, exposure state is maintained, and thus charge reset and charge transmission are repeated to prevent excessive accumulation or leakage of charges. Furthermore, a live-view image is simultaneously displayed by using transmitted charges. However, the invention is not limited thereto, and an after-view image may be displayed instead.

If S2 is not ON in operation S318, the operation proceeds to an operation S322, in which the shutter is opened, the iris is returned, and a live-view image is displayed. As a result, an image capture operation is terminated. A global shutter maintains exposure state without a particular control. After the image capture operation is terminated, the method proceeds back to the operation A1.

FIG. 18 is a flowchart showing the operation A32 performed in case where the digital image processing apparatus 100 is in high-speed continuous photographing mode, according to an embodiment.

If it is determined in an operation S331 that the digital image processing apparatus 100 is in high-speed continuous photographing mode, focus detection is performed based on information phase difference detecting pixels information of imaging pixels during an image capture operation. The operation is referred to as a focus detection (C). In this mode, an iris is maintained at a suitably adjusted state, and a shutter is not opened except when an image is captured. If a global shutter is employed, exposure state is always maintained, and thus an image capture operation may be performed if necessary.

Next, it is determined in an operation S332 whether an object is a moving object. In an operation S333, an object's moving speed Svn is calculated based on a result of the focus detection (C) via the equation shown below.

$$Svn=(f_{n-1}-f_n)/(t_n-t_{n-1}).$$

Here, $f_{n-1}$ denotes a previous location of a moving object on an image plane, $f_n$ denotes the current location of a moving object on an image plane, $t_{n-1}$ denotes a time point at which $f_{n-1}$ is obtained, and $t_n$ denotes a time point at which $f_n$ is obtained.

A correction amount ΔRn to a next focus detection location may be calculated via the equation shown below.

$$\Delta Rn=Svn*Tn$$

Here, Tn denotes a time period from the time point $t_n$ to a time point corresponding to a next focus detection. Meanwhile, in case of a global shutter, focus detection (I) may be performed while a live-view image is being displayed, and thus an object's moving speed may be calculated by using the focus detection (I) and the focus detection (C).

Next, location of a focusing lens is correction-driven by ΔRn during an image capture operation in an operation S334.

If it is determined in the operation S332 that the object is not a moving object, the method may proceed directly to an operation S335.

In the operation S335, an after-view image is displayed. In other words, a captured still image is displayed on a display unit. Next, shutter is charged while the shutter is closed.

Meanwhile, a global shutter may display either an after-view image or a live-view image. In this case, it is not necessary to charge the shutter.

In an operation S336, it is determined whether S2 of the shutter-release button is continuously ON (whether S2 is continuously ON). If S2 of the shutter-release button is continuously ON, an image capture operation is performed in an operation S337, and the object's image data is read out by performing data dump in an operation S338. Next, the method proceeds back to the operation A32.

Meanwhile, if S2 is not ON in the operation S336, the operation proceeds to an operation S339, in which the shutter is opened, the iris is returned, and a live-view image is displayed. As a result, an image capture operation is terminated. A global shutter maintains exposure state without a particular control. After the image capture operation is terminated, the method proceeds back to the operation A1, thereby repeating a series of image capture operations.

As described above, according to the one or more of the embodiments, a moving object prediction AF may be performed based on focus locations detected in previous image capture operations. Therefore, a digital image processing apparatus using an image plane phase difference AF mechanism capable of focusing at a moving object during high-speed continuous image captures and a method of controlling the same may be provided.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A digital image processing apparatus comprising:
   an imaging lens comprising a focusing lens;
   a lens driving unit that drives the focusing lens;
   an imaging device comprising imaging pixels for capturing a light transmitted through the focusing lens and generating image signals, and phase difference detecting pixels for detecting phase difference of a captured image; and
   a control unit that controls the phase difference detecting pixels to perform focus detection by detecting phase difference of a live-view image while the live-view image is output from the imaging pixels,
   wherein, in a continuous photographing mode for continuously capturing still images, the control unit comprises:
   a first calculation unit that performs a first focus detection by detecting phase difference of a still image captured during a first image capture operation;
   a second calculation unit that performs a second focus detection by detecting phase difference of a still image captured during a second image capture operation;
   a moving speed determining unit that determines moving speed of an object based on results of the first focus detection and the second focus detection; and
   a focus location correcting unit that corrects focus location by driving the focusing lens within a preset time period based on the determined moving speed of the object.

2. The digital image processing apparatus of claim 1, wherein the control unit controls the imaging device to not display a live-view image during image capture operations in the continuous photographing mode.

3. The digital image processing apparatus of claim 2, wherein the control unit controls a still image captured by the imaging device to be output as an after-view image in the continuous photographing mode.

4. The digital image processing apparatus of claim 1, wherein the control unit further comprises a third calculation unit that performs a third focus detection by detecting phase difference of a still image captured during a third image capture, and
   the moving speed determining unit determines the moving speed of the object based on results of the first focus detection, the second focus detection, and the third focus detection.

5. The digital image processing apparatus of claim 1, wherein the continuous photographing mode comprises:
   a first continuous photographing mode, in which the imaging device outputs a live-view image; and
   a second continuous photographing mode, in which the imaging device does not output a live-view image.

6. The digital image processing apparatus of claim 5, wherein:
   when the digital image processing apparatus is in the first continuous photographing mode and the imaging device outputs a live-view image, the control unit controls focus detection by detecting phase difference of the live-view image, and
   when the digital image processing apparatus is in the second continuous photographing mode and the imaging device captures a still image, the control unit controls focus detection by detecting phase difference of the captured still image.

7. The digital image processing apparatus of claim 5, wherein, when the digital image processing apparatus is in the second continuous photographing mode, the control unit controls the imaging device to not to display a live-view image and to display a still image captured by the imaging device as an after-view image.

8. The digital image processing apparatus of claim 1, wherein the imaging device further comprises a global shutter that is operable to control exposure time.

9. The digital image processing apparatus of claim 8, wherein in the continuous photographing mode, the imaging device displays live-view images between image captures by using the global shutter.

10. A method of controlling an image plane phase difference digital image processing apparatus in a continuous photographing mode for continuously capturing still images, the method comprising:
    performing a first focus detection by detecting phase difference of an image captured during a first image capture;
    performing a second focus detection by detecting phase difference of an image captured during a second image capture;
    determining moving speed of an object based on results of the first focus detection and the second focus detection; and
    correcting focus location by driving a focusing lens within a preset time period based on the determined moving speed of the object.

11. The method of claim 10, further comprising controlling the imaging device to not to display a live-view image during image capture operations in the continuous photographing mode.

12. The method of claim 11, further comprising outputting a still image captured by the imaging device is as an after-view image in the continuous photographing mode.

13. The method of claim 10, wherein the continuous photographing mode comprises:
    a first continuous photographing mode, in which live-view images are output between continuous image capture operations; and
    a second continuous photographing mode, in which live-view images are not output between continuous image capture operations.

14. The method of claim 13, wherein:
    when the digital image processing apparatus is in the first continuous photographing mode and the imaging device outputs a live-view image, performing focus detection by detecting phase difference of the live-view image, and,
    when the digital image processing apparatus is in the second continuous photographing mode and the imaging device captures a still image, performing focus detection by detecting phase difference of the captured still image.

15. The method of claim 13, wherein the number of still images captured during a unit time period in the second continuous photographing mode is greater than the number of still images captured during the unit time period in the first continuous photographing mode.

16. The method of claim 10, further comprising:
    controlling time period for exposing an imaging device using a global shutter; and
    displaying live-view images between continuous image capture operations in the continuous photographing mode.

17. The method of claim 16, the method further comprises:
- when a live-view image is being displayed, performing focus detection by detecting phase difference of the live-view image;
- when the still image is captured, performing focus detection by detecting phase difference of the captured still image;
- determining moving speed of an object based on a result of the focus detection from the live-view image and a result of the focus detection from the captured still image; and
- correcting a focus location based on the determined moving speed of the object during a next image capture operation.

18. A non-transitory computer readable recording medium having recorded thereon a computer program executable by a processor for implementing the method of claim 10.

* * * * *